US 10,775,771 B1

(12) United States Patent
Elford

(10) Patent No.: US 10,775,771 B1
(45) Date of Patent: Sep. 15, 2020

(54) COMPUTER IMPLEMENTED METHOD AND SYSTEM FOR GENERATING SLOPE SYNCHRONIZED TOOL PATHS FOR INCREMENTAL SHEET FORMING

(71) Applicant: The Boeing Company, Chicago, IL (US)

(72) Inventor: Michael C. Elford, Springfield (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/422,898

(22) Filed: May 24, 2019

(51) Int. Cl.
| G05B 19/4099 | (2006.01) |
| G05B 19/19 | (2006.01) |
| B21D 31/00 | (2006.01) |
| G01B 21/20 | (2006.01) |
| G01B 21/22 | (2006.01) |

(52) U.S. Cl.
CPC ......... *G05B 19/4099* (2013.01); *G01B 21/20* (2013.01); *G01B 21/22* (2013.01); *G05B 2219/32154* (2013.01); *G05B 2219/34187* (2013.01)

(58) Field of Classification Search
CPC ...... G05B 19/4099; G05B 2219/32154; G05B 2219/34187; G01B 21/22; G01B 21/20
See application file for complete search history.

(56) References Cited

U.S. PATENT DOCUMENTS

| 9,168,580 | B2* | 10/2015 | Cao | B21D 31/005 |
| 9,676,019 | B2* | 6/2017 | Elford | B21D 31/06 |
| 10,162,330 | B2* | 12/2018 | Peters | G05B 19/402 |
| 2017/0227947 | A1* | 8/2017 | Ndip-Agbor | G05B 19/29 |
| 2018/0113432 | A1* | 4/2018 | Peters | G05B 19/402 |

* cited by examiner

*Primary Examiner* — Charles R Kasenge

(57) ABSTRACT

There is provided a computer implemented method for generating slope synchronized tool paths for incremental sheet forming (ISF) of a contoured part. The method includes performing a slope synchronized tool path application execution with a computer and a slope synchronized tool path application. The slope synchronized tool path application execution includes defining equally spaced apart Z values, along a Z-axis, that intersect a surface of the contoured part; determining, for the Z values, a slope factor, to define an array of Z values and corresponding slope factor values; and setting a current Z coordinate, and iteratively, calculating a stepdown; decrementing a current Z coordinate by the calculated stepdown; and determining an intersection of the surface with a horizontal plane at the current Z coordinate, to produce a contour tool path loop. The method includes sending an output file to a numerically controlled ISF machine, to incrementally form the contoured part.

20 Claims, 23 Drawing Sheets

COMPUTER IMPLEMENTED METHOD AND SYSTEM FOR GENERATING SLOPE SYNCHRONIZED TOOL PATHS FOR INCREMENTAL SHEET FORMING

FIELD

The disclosure relates generally to methods and systems for manufacturing parts using an incremental sheet forming (ISF) process, and more particularly, to methods and systems for manufacturing contoured parts, such as aircraft contoured parts, by generating slope synchronized tool paths for an incremental sheet forming process.

BACKGROUND

Part forming processes, such as incremental sheet forming (ISF), may be used to manufacture parts, such as contoured parts, including new parts, replacement parts, and spare parts, for vehicles, such as aircraft. ISF is a sheet metal forming process that uses a forming tool to deform sheet metal along a predefined tool path, to impart the sheet metal with a desired shape, such as a three-dimensional shape. ISF tooling may be used with a computer numerical control (CNC) machine or another suitable machine or system to form the sheet metal into the desired shape for the part.

ISF is typically achieved by using a fixed or constant distance between Z-level tool paths. This approach may be suitable for a fixed or constant wall angle part but may result in an uneven step-across when there are different wall angles on the same part. For example, a fixed or constant stepdown may be too large for steep slopes, or may be too small for shallow slopes, and this may result in formed parts with surface imperfections, such as ridges or blemishes. This may, in turn, require additional surface treatment processes to remove or reduce the surface imperfections. Such additional surface treatment processes may increase the overall time and expense of the part manufacturing, or may result in a part that does not meet the design specification.

In addition, ISF may use known CAM (computer-aided manufacturing) software for part forming. Such known CAM software allows for tool path features and tools which are based around the machining process, where material is removed to sculpt a part out of a solid block of material. However, such tool path features and tools do not allow for a wall angle sensitive stepdown, in combination with Z level (contour type) tool paths.

Accordingly, there is a need in the art for methods and systems for generating tool paths for part forming manufacturing, such as incremental sheet forming (ISF) manufacturing, of parts, that result in formed parts with decreased surface imperfections, improved shape definition, improved quality, reduced need for additional surface treatment processes, and that provide significant advantages over known methods and systems.

SUMMARY

Example implementations of this disclosure provide methods and systems for generating tool paths, such as slope synchronized tool paths, for part forming manufacturing, such as incremental sheet forming (ISF) manufacturing, of contoured parts. As discussed in the below detailed description, versions of the methods and systems may provide significant advantages over existing methods and systems.

In one exemplary version, there is provided a computer implemented method for generating a series of slope synchronized tool paths for incremental sheet forming (ISF) of a contoured part. The computer implemented method comprises the step of providing a computer system comprising a computer having a processor device, and comprising a modeling application and a slope synchronized tool path application, each implemented by a computer readable software program and each executed by the computer.

The computer implemented method further comprises the step of performing, with the computer and the slope synchronized tool path application, a slope synchronized tool path application execution. The slope synchronized tool path application execution comprises the substep of defining a plurality of equally spaced apart Z values along a Z-axis, where each of the plurality of equally spaced apart Z values intersects a surface that approximates a three-dimensional geometry of the contoured part. The slope synchronized tool path application execution further comprises the substep of determining, for each of the plurality of equally spaced apart Z values, a slope factor based on a maximal Z-axis component of a normal vector for the surface intersecting each of the plurality of equally spaced apart Z values, to define an array of Z values and slope factor values that correspond to the Z values. The slope synchronized tool path application execution further comprises the sub step of setting an initial Z coordinate corresponding to a starting portion of the surface, as a current Z coordinate.

The slope synchronized tool path application execution further comprises the substeps of, then iteratively, calculating a stepdown as a sum of a minimum stepdown and a percentage of a maximum stepdown less the minimum stepdown, to obtain a calculated stepdown, the percentage based on a current slope factor for the current Z coordinate that is calculated based on the array of Z values and the slope factor values that correspond to the Z values; decrementing the current Z coordinate by the calculated stepdown; and determining an intersection of the surface with a horizontal plane at the current Z coordinate, to define a collection of analytical curves in the horizontal plane, to produce a contour tool path loop for the current Z coordinate, wherein the slope synchronized tool path application creates a plurality of contour tool path loops that are each respectively spaced apart by slope synchronized stepdowns, to obtain the series of slope synchronized tool paths.

The computer implemented method further comprises the step of sending an output file, using the computer, to a numerically controlled incremental sheet forming (ISF) machine, which causes the numerically controlled incremental sheet forming (ISF) machine to direct an incremental sheet forming (ISF) tool along the series of slope synchronized tool paths comprising the plurality of contour tool path loops spaced apart by the slope synchronized stepdowns, to incrementally form the contoured part.

In another version, there is provided a computer implemented method for generating a series of slope synchronized tool paths for incremental sheet forming (ISF) of an aircraft contoured part. The computer implemented method comprises the step of providing a computer system comprising a computer having a processor device, and comprising a modeling application and a slope synchronized tool path application, each implemented by a computer readable software program and each executed by the computer.

The computer implemented method further comprises the step of performing, with the computer and the modeling application, a surface discretization of a three-dimensional geometry of the aircraft contoured part, to produce a surface mesh of polygons that approximates the three-dimensional geometry of the aircraft contoured part. The computer implemented method further comprises the step of performing, with the computer and the slope synchronized tool path application, a slope synchronized tool path application execution.

The slope synchronized tool path application execution comprises the substep of defining a plurality of horizontal planes equally spaced apart at a plurality of Z values along a Z-axis, where each of the plurality of horizontal planes intersects the surface mesh of polygons that approximates the three-dimensional geometry of the aircraft contoured part. The slope synchronized tool path application execution further comprises the substep of determining, for each of the plurality of horizontal planes, a slope factor based on a maximal Z-axis component of a normal vector for each polygon intersecting each of the plurality of horizontal planes, to define a lookup table of Z values and slope factor values that correspond to the Z values. The slope synchronized tool path application execution further comprises the substep of setting an initial Z coordinate corresponding to a starting portion of the surface mesh, as a current Z coordinate.

The slope synchronized tool path application execution further comprises the substeps of, then iteratively, calculating a stepdown as a sum of a minimum stepdown and a percentage of a maximum stepdown less the minimum stepdown, to obtain a calculated stepdown. The percentage is based on a current slope factor for the current Z coordinate, that is calculated based on the lookup table of the Z values and the slope factor values that correspond to the Z values; decrementing the current Z coordinate by the calculated stepdown; and determining an intersection of the surface mesh with a selected horizontal plane at the current Z coordinate, to define a collection of vectors in the selected horizontal plane, and sorting the collection of vectors to be in a tip-to-tail arrangement, to produce a contour tool path loop for the current Z coordinate, wherein the slope synchronized tool path application creates a plurality of contour tool path loops that are each respectively spaced apart by slope synchronized stepdowns, to obtain the series of slope synchronized tool paths.

The computer implemented method further comprises the step of sending an output file, using the computer, to a numerically controlled incremental sheet forming (ISF) machine, which causes the numerically controlled incremental sheet forming (ISF) machine to direct an incremental sheet forming (ISF) tool along the series of slope synchronized tool paths comprising the plurality of contour tool path loops spaced apart by the slope synchronized stepdowns, to incrementally form the aircraft contoured part.

In another version, there is provided a computer implemented system for generating a series of slope synchronized tool paths for incremental sheet forming (ISF) of a contoured part. The computer implemented system comprises a computer having a processor device and a modeling application implemented by a first computer readable software program and executed by the computer. The modeling application is adapted to perform a surface discretization of a three-dimensional geometry of the contoured part, to produce a surface mesh of polygons that approximates the three-dimensional geometry of the contoured part.

The computer implemented system further comprises a slope synchronized tool path application implemented by a second computer readable software program and executed by the computer. The slope synchronized tool path application is adapted to define a plurality of equally spaced apart Z values along a Z-axis, where each of the plurality of equally spaced apart Z values intersects the surface mesh of polygons that approximates the three-dimensional geometry of the contoured part. The slope synchronized tool path application is further adapted to determine, for each of the plurality of equally spaced apart Z values, a slope factor based on a maximal Z-axis component of a normal vector, for each polygon intersecting each of the plurality of equally spaced apart Z values, to define an array of Z values and slope factor values that correspond to the Z values. The slope synchronized tool path application is further adapted to set an initial Z coordinate corresponding to a starting portion of the surface mesh, as a current Z coordinate.

The slope synchronized tool path application is then adapted to iteratively calculate a stepdown as a sum of a minimum stepdown and a percentage of a maximum stepdown less the minimum stepdown, to obtain a calculated stepdown, the percentage based on a current slope factor for the current Z coordinate, that is calculated based on the array of the Z values and the slope factor values that correspond to the Z values; decrement the current Z coordinate by the calculated stepdown; and determine an intersection of the surface mesh with a horizontal plane at the current Z coordinate, to define a collection of vectors in the horizontal plane, to produce a contour tool path loop for the current Z coordinate. The slope synchronized tool path application creates a plurality of contour tool path loops that are each respectively spaced apart by slope synchronized stepdowns, to obtain the series of slope synchronized tool paths.

The computer sends an output file to a numerically controlled incremental sheet forming (ISF) machine. This causes the numerically controlled incremental sheet forming (ISF) machine to direct an incremental sheet forming (ISF) tool along the series of slope synchronized tool paths comprising the plurality of contour tool path loops spaced apart by the slope synchronized stepdowns, to incrementally form the contoured part.

The features, functions, and advantages that have been discussed can be achieved independently in various versions of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale, wherein.

The Figures shown in this disclosure represent various aspects of the versions presented, and only differences will be discussed in detail.

DETAILED DESCRIPTION

Disclosed versions or examples will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 1A:
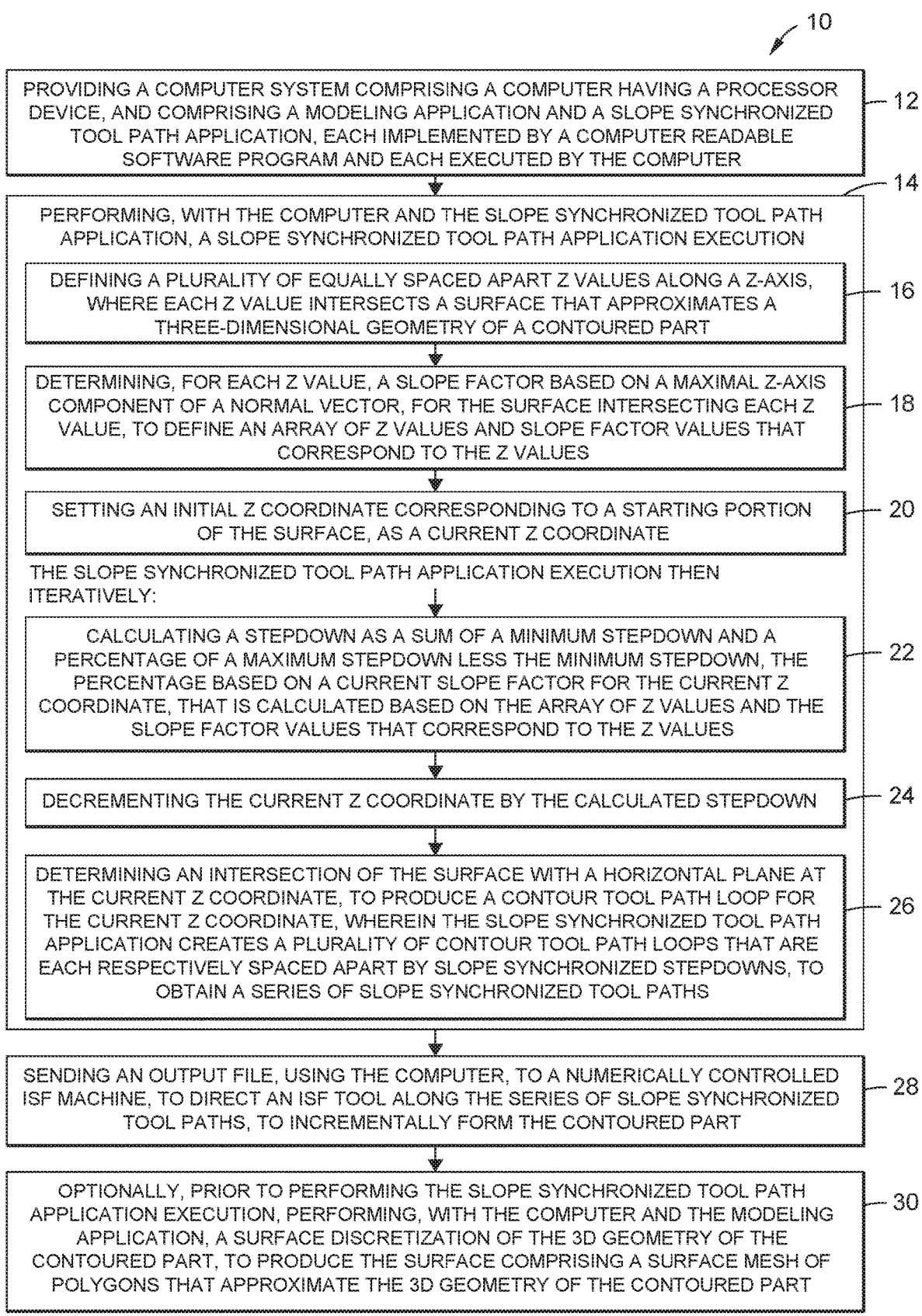
FIG. 1A is an illustration of a flow diagram showing an exemplary version of a computer implemented method of the disclosure.

Now referring to the Figures, FIG. 1A is an illustration of a flow diagram showing an exemplary version of a computer implemented method 10 of the disclosure with method steps 12-30. In one version of the disclosure, as shown in FIG. 1A, there is provided the computer implemented method 10 for generating a series of slope synchronized tool paths 32 (see FIG. 2A) for incremental sheet forming (ISF) 34 (see FIG. 2A) of a contoured part 36 (see FIG. 2A).

Figure 1B:
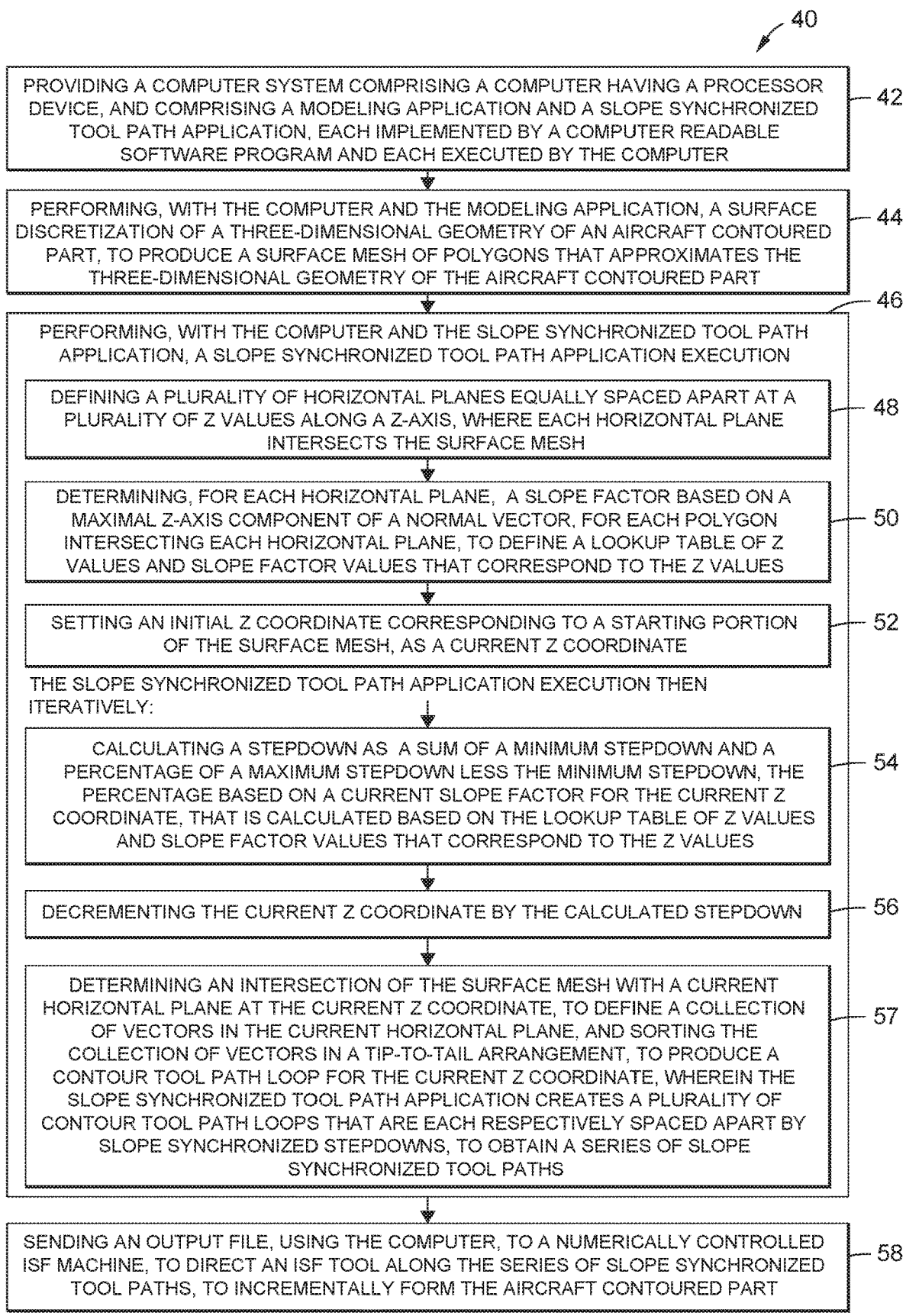
FIG. 1B is an illustration of a flow diagram showing another exemplary version of a computer implemented method of the disclosure.

FIG. 1B is an illustration of a flow diagram showing an exemplary version of another computer implemented method 40 of the disclosure with method steps 42-58. In another version of the disclosure, as shown in FIG. 1B, there is provided the computer implemented method 40 for generating a series of slope synchronized tool paths 32 (see FIG. 2A) for ISF 34 (see FIG. 2A) of an aircraft contoured part 38 (see FIG. 2A).

The blocks in FIGS. 1A-1B represent operations and/or portions thereof, or elements, and lines connecting the various blocks do not imply any particular order or dependency of the operations or portions thereof, or elements. FIGS. 1A-1B and the disclosure of the steps of the computer implemented method 10 and the computer implemented method 40, respectively, set forth herein, should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

Figure 2A:
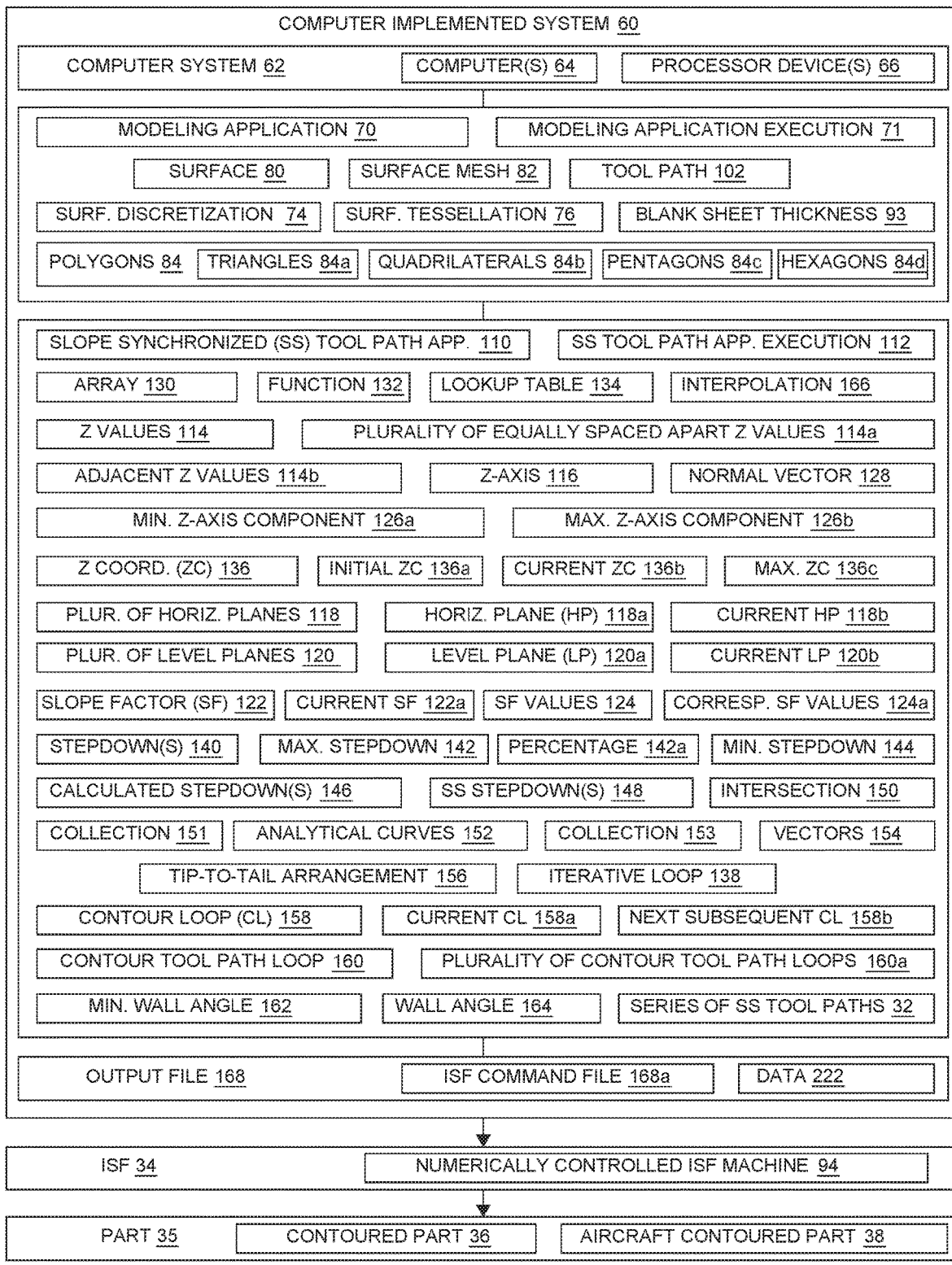
FIG. 2A is an illustration of a functional block diagram showing an exemplary computer implemented system of the disclosure.
Figure 2B:
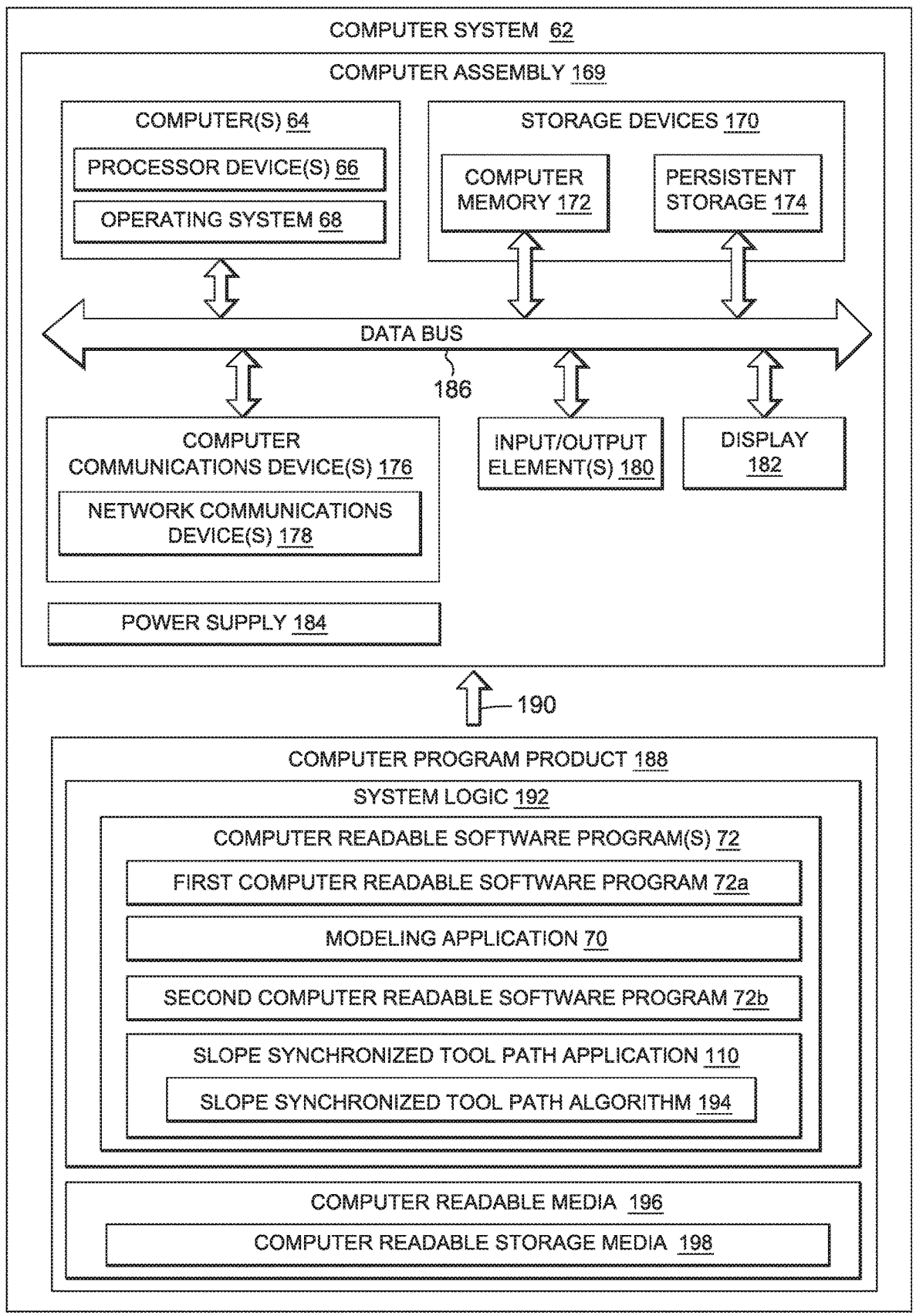
FIG. 2B is an illustration of a functional block diagram showing an exemplary computer system that may be used with the computer implemented methods and the computer implemented system of the disclosure.

As discussed with the computer implemented method 10 and the computer implemented method 40, respectively, of FIGS. 1A-1B, FIG. 2A is an illustration of a functional block diagram showing an exemplary computer implemented system 60 of the disclosure, and FIG. 2B is an illustration of a functional block diagram showing an exemplary computer system 62 that may be used with the computer implemented method 10, the computer implemented method 40, and the computer implemented system 60 of the disclosure. In another version of the disclosure, as shown in FIG. 2A, there is provided the computer implemented system 60 for generating a series of slope synchronized tool paths 32 for ISF 34 of a contoured part 36, such as an aircraft contoured part 38.

As shown in FIG. 1A, the computer implemented method 10 comprises the step of providing 12 the computer system 62 (see FIGS. 2A-2B). As shown in FIGS. 2A-2B, the computer system 62 comprises one or more computers 64 having one or more processor devices 66. The computer (see FIGS. 2A-2B) further comprises an operating system 68 (see FIG. 2B).

As shown in FIGS. 2A-2B, the computer system 62 further comprises a modeling application 70 implemented by a computer readable software program 72 (see FIG. 2A), such as a first computer readable software program 72a (see FIG. 2A), and executed by the computer 64, to perform a modeling application execution 71 (see FIG. 2A). The computer readable software program 72 (see FIG. 2A), such as the first computer readable software program 72a, used to implement the modeling application 70 may comprise a computer aided design (CAD) program, a computer aided manufacturing (CAM) program, a computer aided engineering (CAE) program, a tool path manufacturing workbench program, or another suitable computer readable software program 72, or a combination thereof.

Figure 3:
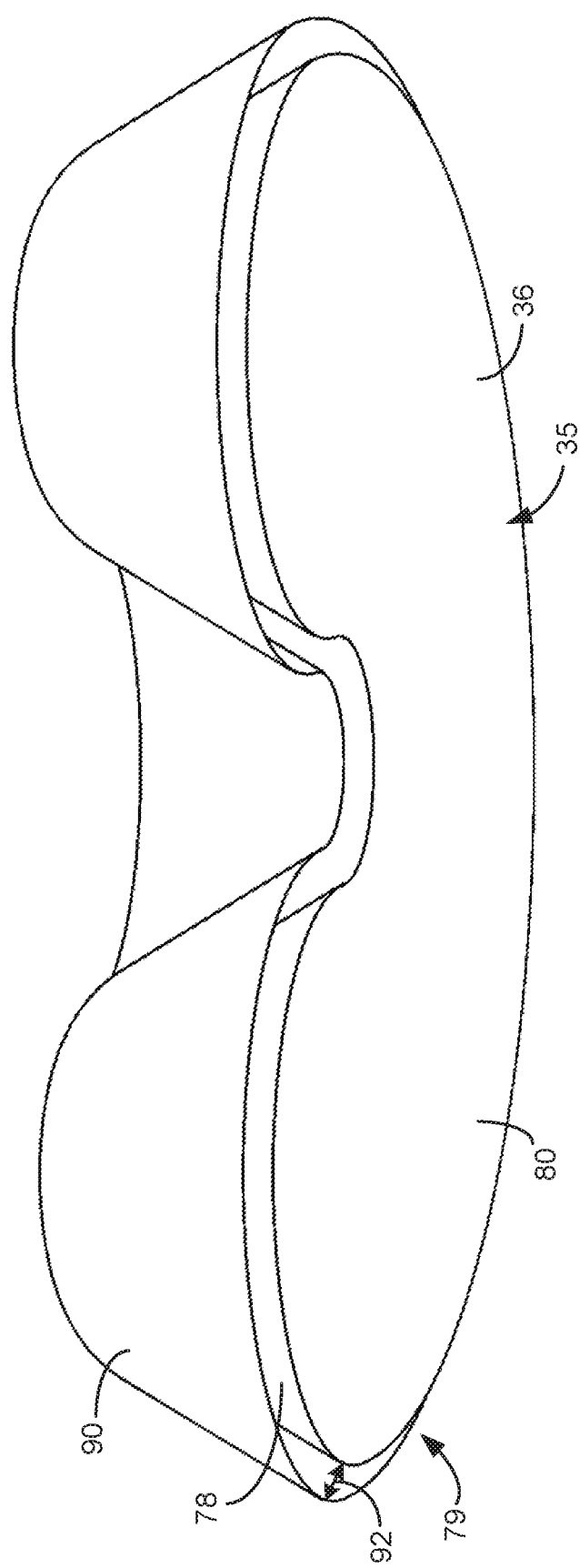
FIG. 3 is an illustration of a bottom perspective view of a model of a part and an offset surface.
Figure 4:
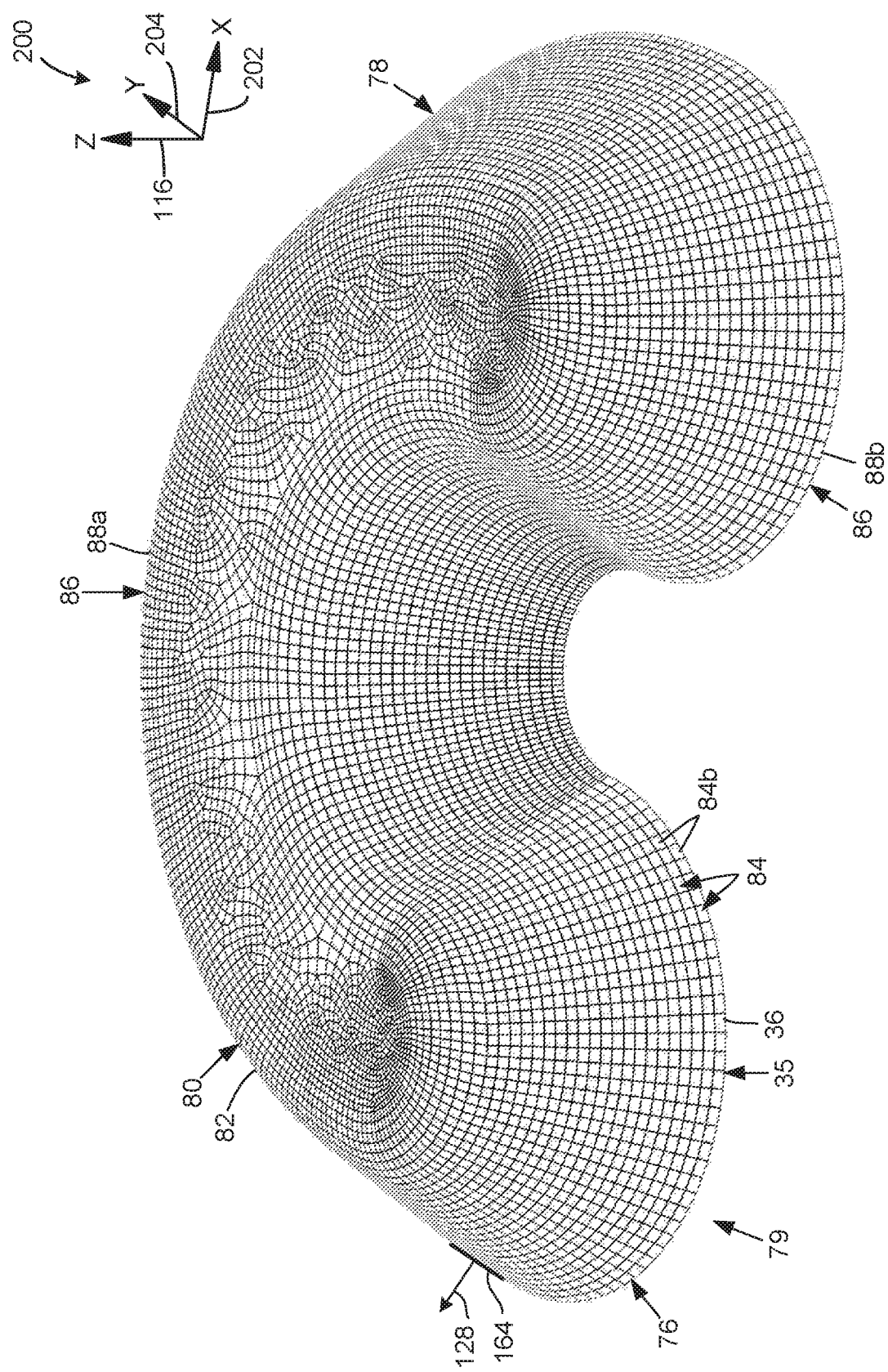
FIG. 4 is an illustration of a top perspective view of a surface mesh of a model of a part.
Figure 12:
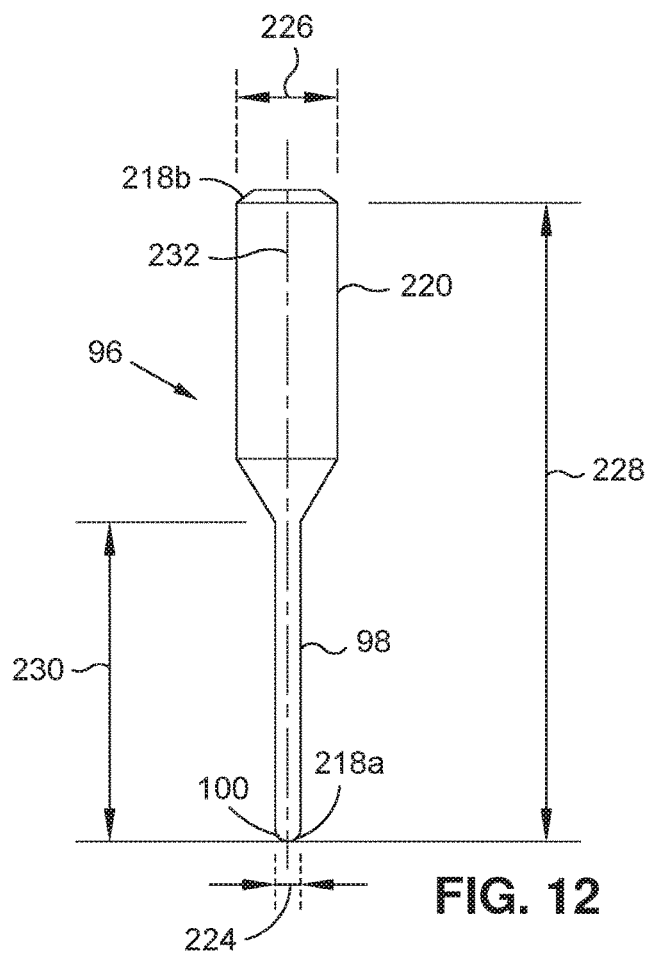
FIG. 12 is an illustration of a front view of an exemplary incremental sheet forming (ISF) tool that may be used with the computer implemented methods and the computer implemented system of the disclosure.

The modeling application 70 is adapted to perform, and performs, a surface discretization 74 (see FIG. 2A), for example, a surface tessellation 76 (see FIGS. 2A, 4), also referred to as a surface mesh 82 (see FIGS. 2A, 4), of a three-dimensional geometry 78 (see FIGS. 3, 4), of a model 79 (see FIGS. 3, 4) of the part 35 (see FIGS. 2A, 3, 4), such as the contoured part 36 (see FIGS. 2A, 3, 4), to produce a surface 80 (see FIGS. 2A, 3, 4). The surface 80 may comprise the surface mesh 82 (see FIGS. 2, 4A) of a plurality or collection of polygons 84 (see FIGS. 2A, 4) that approximates or represents the three-dimensional geometry 78 (see FIGS. 2A, 4) of the model 79 (see FIGS. 3, 4) of the contoured part 36 (see FIG. 2A). As shown in FIG. 2A, the plurality, or collection, of polygons 84 may comprise one or more of, triangles 84a, quadrilaterals 84b, pentagons 84c, hexagons 84d, another suitable polygon 84 or polygonal shape, or a combination of two or more of the polygons 84, that approximates or represents the three-dimensional geometry 78 of the contoured part 36. The surface 80, such as in the form of the surface mesh 82, has extreme ends 86 (see FIG. 4), such as a starting portion 88a (see FIG. 4), for example, a top-most portion or another portion of the surface 80, and an ending portion 88b (see FIG. 4), for example, a bottom-most portion or another portion of the surface 80. The modeling application 70 may generate, or be adapted to, or configured to, generate, an offset surface 90 (see FIG. 3) spaced a constant offset distance 92 (see FIG. 3) from the surface 80 (see FIG. 3), such as the surface mesh 82, of the three-dimensional geometry 78 (see FIG. 3) of the model 79 (see FIG. 3) of the part 35 (see FIG. 3), such as the contoured part 36 (see FIG. 3). The ISF 34 (see FIG. 2A) may use a numerically controlled incremental sheet forming (ISF) machine 94 (see FIG. 2A) with an incremental sheet forming (ISF) tool 96 (see FIGS. 12-13), or ISF stylus, having an incremental sheet forming (ISF) tool tip 98 (see FIG. 12). As shown in FIG. 12, the ISF tool tip 98 has an incremental sheet forming (ISF) tool tip radius 100. The offset surface 90 (see FIG. 3) may be generated to take into account the ISF tool tip radius 100 (see FIG. 12) and to take into account a blank sheet thickness 93 (see FIG. 2A) of a blank sheet, such as a blank metal sheet, used in the numerically controlled ISF machine 94, and the offset surface 90 may be formed to make a tool path 102 (see FIGS. 2A, 13). As used here, a "tool path" means a path or geometry that a tool, such as an ISF tool 96 (see FIG. 12), or a forming tool stylus, must follow to form a designed part.

An offset surface 90 (see FIG. 3) is generated from the surface 80 (see FIG. 3) of the part 35 (see FIG. 3), such as the contoured part 36 (see FIG. 3). The offset surface 90 is calculated such that it maintains a constant offset distance 92 (see FIG. 3) from the surface 80. The tool path 102 (see FIGS. 2A, 13) is generated from the offset surface 90.

As shown in FIG. 1A, the computer implemented method 10 further comprises the step of performing 14, with the computer 64 and a slope synchronized tool path application 110 (see FIGS. 2A-2B), a slope synchronized tool path application execution 112 (see FIG. 2A). The slope synchronized tool path application 110 is implemented by a computer readable software program 72 (see FIG. 2B), such as a second computer readable software program 72b (see FIG. 2B), and is executed by the computer 64. The slope synchronized tool path application 110 performs, and is adapted to perform, the slope synchronized tool path application execution 112.

As shown in FIG. 1A, the slope synchronized tool path application execution 112 comprises the substep of defining 16 a plurality of Z values 114 that are equally spaced apart along a Z-axis 116, for example, a plurality of equally spaced apart Z values 114a. Each of the plurality of equally spaced apart Z values 114a intersects the surface 80, such as the surface mesh 82, that approximates or represents the three-dimensional geometry 78 of the contoured part 36. In one version, the plurality of equally spaced apart Z values 114a may include a plurality of horizontal planes 118, such as a plurality of level planes 120, or x-y planes. The Z-axis 116 has a minimal Z-axis component 126a (see FIG. 2A) and a maximal Z-axis component 126b (see FIG. 2A).

As shown in FIG. 1A, the slope synchronized tool path application execution 112 further comprises the substep of determining 18, for each of the plurality of equally spaced apart Z values 114a, a slope factor 122 (see FIG. 2A) based on a maximal Z-axis component 126b (see FIG. 2A) of a normal vector 128 (see FIG. 2A), for the surface 80 intersecting each of the plurality of equally spaced apart Z values 114a, to define an array 130, or a function 132, of Z values 114 and slope factor values 124 that correspond to the Z values 114. The Z values 114 and the slope factor values 124 that correspond to the Z values 114, that is, the corresponding slope factor values 124a (see FIG. 2A), are defined and stored in the array 130, or the function 132. The array 130 may comprise a lookup table 134 comprised of the Z values 114 and the corresponding slope factor values 124a. As used here, "normal vector" means the normalized cross product of any two (2) edges of a planar polygon.

As used herein, the term "array" means a systematic arrangement of similar objects, such as values, usually in rows and/or columns, and as disclosed herein, includes Z values 114 and slope factor values 124 that correspond to the Z values, respectively.

As used herein, the term "lookup table" means an array that can store multiple key-value pairs. The lookup table is used by searching for a particular key in the table and retrieving the value associated with that key, if it has been stored in the table. The lookup table may be manually populated when a software program is written, or the software program may populate the table with values as it calculates them. When the values are needed later, the software program can look them up, saving computer and processing resources.

As used herein, the term "function" means a process that associates to each element of a set X, a single element of a set Y.

As shown in FIG. 2A, the slope synchronized tool path application execution 112 further comprises the substep of setting 20 a Z coordinate 136 (see FIG. 2A), such as an initial Z coordinate 136a (see FIG. 2A) corresponding to the starting portion 88a (see FIG. 4) of the surface 80 (see FIGS. 2A, 4), such as the surface mesh 82 (see FIGS. 2A, 4), as a current Z coordinate 136b (see FIG. 2A). The Z value 114 is reset to be a maximum Z coordinate 136c (see FIG. 2A) of the surface 80, such as the surface mesh 82, or such as the offset surface 90 (see FIG. 3).

As shown in FIG. 2A, the slope synchronized tool path application execution 112 then iteratively comprises the substeps, in an iterative loop 138 (see FIG. 2A), of calculating 22 a stepdown 140 (see FIG. 2A) as a sum of a minimum stepdown 144 and a percentage 142a (see FIG. 2A) of a maximum stepdown 142 (see FIG. 2A) less the minimum stepdown 144 (i.e., a percentage 142a of the difference between the maximum stepdown 142 and the minimum stepdown 144), to obtain a calculated stepdown 146 (see FIG. 2A), where the percentage 142a is based on a current slope factor 122a (see FIG. 2A) for the current Z coordinate 136b, that is calculated based on the array 130 of the Z values 114 and the slope factor values 124 that correspond to the Z values 114; decrementing 24 the current Z coordinate 136b by the calculated stepdown 146; and determining 26 an intersection 150 (see FIG. 2A) of the surface 80 with a horizontal plane 118a (see FIG. 2A) at the current Z coordinate 136*b*, to define a collection 153 (see FIG. 2A) of vectors 154 (see FIG. 2A) in the horizontal plane 118*a*, to produce a contour loop 158 (see FIG. 2A), such as a contour tool path loop 160 (see FIGS. 2A, 6B), for the current Z coordinate 136*b*. The slope synchronized tool path application 110 creates a plurality of contour tool path loops 160*a* (see FIGS. 2A, 5B, 6B, 7B, 8B, 9B, 10B, 11B) that are each respectively spaced apart by slope synchronized stepdowns 148 (see FIG. 2A), to obtain the series of slope synchronized tool paths 32.

Each stepdown 140 (see FIG. 2A), such as each slope synchronized stepdown 148 (see FIG. 1A), may have a maximum stepdown 142 (see FIG. 2A) and a minimum stepdown 144 (see FIG. 2A), which are set by a user of the modeling application 70. In one example, the user may select a maximum stepdown 142 of 8.0 mm (eight millimeters) and a minimum stepdown 144 of 0.5 mm (zero point five millimeter) to incrementally sheet form a part with bounding dimensions of 300 mm (three hundred millimeters) wide by 300 mm (three hundred millimeters) long and 200 mm (two hundred millimeters) deep, with an initial blank sheet thickness of 1 mm (one millimeter), using a 30 mm (thirty millimeter) diameter stylus tool.

As used herein, the term "slope factor" means a maximal Z-axis component of a normal vector of each surface intersecting each of the plurality of equally spaced apart Z values, or each polygon intersected by each horizontal plane, or intersected by each level plane. As used herein, the term "current slope factor" means a given slope factor for a current Z coordinate.

As used herein, "Z value" means a value along a Z-axis. As used herein, "Z coordinate" means a coordinate whose value is determined by measuring parallel to a Z-axis. As used herein, "current Z coordinate" means a Z coordinate at the current point in the slope synchronized tool path application execution.

As used here, "stepdown" means a ΔZ distance, for example, a vertical distance, from one contour loop or contour tool path loop, to the next subsequent contour loop or contour tool path loop.

As used herein, "slope synchronized tool path" means a Z-level tool path with slope synchronized stepdowns that are not necessarily constant or fixed, and vary in distance between contour loops or contour tool path loops, depending on the slope of the part, such as the contoured part.

With the slope synchronized tool path application execution 112 of the slope synchronized tool path application 110, all of the polygons 84 that intersect the horizontal plane 118*a*, or the level plane 120*a*, i.e., x-y plane, with the current Z coordinate 136*b*, are determined. The intersection 150 of each of the polygons 84 with the horizontal plane 118*a*, or the level plane 120*a*, is processed to produce the collection 153 of vectors 154 in the horizontal plane 118, or the level plane 120*a*. The step of determining 26 the intersection 150 of the surface 80, such as the surface mesh 82, with the horizontal plane 118*a* at the current Z coordinate 136*b*, to define the collection 153 of vectors 154 in the horizontal plane 118*a*, may further comprise, sorting the collection 153 of vectors 154 in a tip-to-tail arrangement 156, to produce the contour loop 158, such as the contour tool path loop 160, for the current Z coordinate 136*b*.

Another way of achieving the slope synchronized tool path application execution 112 of the slope synchronized tool path application 110 is calculating a minimum wall angle 162 (see FIG. 2A) on a current contour loop 158*a* (see FIG. 2A) and using the minimum wall angle 162 (see FIG. 2A) that is calculated to adjust the stepdown 140 on a next subsequent contour loop 158*b* (see FIG. 2A). A wall angle 164 (see FIG. 2A) is the angle or slope of the surface 80 or polygon 84 with respect to the horizontal plane 118*a*, or the level plane 120*a*, i.e. the x-y plane. A minimum wall angle 162 is the smallest or most minimum of the wall angles 164 along that current contour loop 158*a*.

The step of calculating 22 the stepdown 140 may further comprise, calculating the current slope factor 122*a* for the current Z coordinate 136*b* using interpolation 166 (see FIG. 2A), when the current Z coordinate 136*b* is between two adjacent Z values 114*b* of the Z values 114 defined in the array 130. The slope factor 122 may be calculated from the array 130 of Z values 114 that are stored in the array 130, via interpolation 166, in order to find a Z value 114 which corresponds to the current Z coordinate 136*b*. Interpolation 166 may be used when the array 130 or the lookup table 134 does not have the exact Z value 114 listed in the array 130 or lookup table 134 of the Z values 114 and the slope factor values 124 corresponding to the Z values 114.

As used herein, the term "interpolation" means a method of estimating new data points within a range of a discrete set of known data points, for example, between two adjacent Z values 114*b* in the array 130.

The step of calculating 22 may further comprise, calculating the stepdown 140, i.e., ΔZ, as the minimum stepdown 144 plus (the maximum stepdown 142 minus the minimum stepdown 144) multiplied by a quantity of 1 (one) minus the current slope factor 122*a*, to obtain the calculated stepdown 146, that is, (ΔZ (delta Z, i.e., stepdown)=minimum stepdown+(maximum stepdown−minimum stepdown)×(1.0−slope factor).

As shown in FIG. 1A, the computer implemented method 10 further comprises the step of sending 28 an output file 168, using the computer 64, to a numerically controlled incremental sheet forming (ISF) machine 94. This causes the numerically controlled ISF machine 94 to direct an incremental sheet forming (ISF) tool 96 along the series of slope synchronized tool paths 32 comprising the plurality of contour tool path loops 160*a* spaced apart by the slope synchronized stepdowns 148, to incrementally form the contoured part 36. The output file 168 may comprise an incremental sheet forming (ISF) command file 168*a* (see FIG. 2A) to provide commands or instructions to the numerically controlled ISF machine 94, or may comprise another suitable type of output file 168.

As shown in FIG. 1A, the computer implemented method 10 may further comprise prior to the step of performing 14 the slope synchronized tool path application execution 112, the step of performing 30, with the computer 64 and the modeling application 70 (see FIG. 2A), the surface discretization 74 (see FIG. 2A) of the three-dimensional geometry 78 (see FIGS. 3, 4) of the part 35 (see FIG. 2A), such as the contoured part 36 (see FIG. 2A), to produce the surface 80 (see FIGS. 2A, 3) comprising the surface mesh 82 (see FIGS. 2A, 4), of polygons 84 (see FIGS. 2A, 4) that approximates or represents the three-dimensional geometry 78 of the contoured part 36. The step of performing 30 the surface discretization 74 of the three-dimensional geometry 78 of the contoured part 36, further comprises, performing 30 the surface discretization 74, to produce the surface mesh 82 of polygons 84 comprising one or more of, triangles 84*a* (see FIG. 2A), quadrilaterals 84*b* (see FIGS. 2A, 4), pentagons 84*c* (see FIG. 2A), hexagons 84*d* (see FIG. 2A), another suitable polygon 84, or a combination of the polygons 84, for example, a combination of two or more of the triangles 84*a*, quadrilaterals 84*b*, pentagons 84*c*, hexagons 84*d*, or other suitable polygons 84, that approximates or represents the three-dimensional geometry 78 of the part 35, such as the contoured part 36. As used herein, "surface discretization" means an approximation of a surface with a collection of simpler geometries, for example, triangles, quadrilaterals, or other polygons, and the process of transferring continuous functions, models, variables, and equations of surfaces into discrete counterparts.

Now referring to FIG. 1B, FIG. 1B shows the computer implemented method 40 for generating a series of slope synchronized tool paths 32 (see FIG. 2A) for ISF 34 (see FIG. 2A) of a aircraft contoured part 38 (see FIG. 2A). As shown in FIG. 1B, the computer implemented method 40 comprises the step of providing 42 a computer system 62 (see FIGS. 2A-2B) comprising a computer 64 (see FIGS. 2A-2B) having a processor device 66 (see FIG. 2B), and comprising a modeling application 70 (see FIGS. 2A-2B) and a slope synchronized tool path application 110 (see FIGS. 2A-2B). The modeling application 70 is implemented by a computer readable software program 72 (see FIG. 2B), such as a first computer readable software program 72a, and the modeling application 70 is executed by the computer 64. The slope synchronized tool path application 110 is implemented by a computer readable software program 72 (see FIG. 2B), such as a second computer readable software program 72b, and the slope synchronized tool path application 110 is executed by the computer 64.

As shown in FIG. 1B, the computer implemented method 40 further comprises the step of performing 44, with the computer 64 and the modeling application 70, a surface discretization 74 (see FIG. 2A) of a three-dimensional geometry 78 (see FIGS. 3, 4) of the part 35 (see FIG. 2A), such as the aircraft contoured part 38 (see FIGS. 2A, 14), to produce a surface mesh 82 (see FIGS. 2A, 4) of polygons 84 (see FIGS. 2A, 4) that approximates or represents the three-dimensional geometry 78 of the aircraft contoured part 38. As shown in FIG. 2A, the plurality, or collection, of polygons 84 may comprise one or more of, triangles 84a, quadrilaterals 84b, pentagons 84c, hexagons 84d, another suitable polygon 84 or polygonal shapes, or a combination of the polygons 84, that approximates or represents the three-dimensional geometry 78 of the aircraft contoured part 38. As shown in FIG. 4, the surface mesh 82, has extreme ends 86, such as the starting portion 88a and the ending portion 88b.

The step of performing 44 the surface discretization 74 of the three-dimensional geometry 78 of the aircraft contoured part 38 may further comprise, using the modeling application 70 to generate an offset surface 90 (see FIG. 3) spaced a constant offset distance 92 (see FIG. 3) from the surface 80 (see FIGS. 2A, 3), such as the surface mesh 82 (see FIGS. 2A, 4), that approximates or represents the three-dimensional geometry 78 (see FIG. 3) of the aircraft contoured part 38 (see FIG. 2A), to account for an ISF tool tip radius 100 (see FIG. 12) of an ISF tool tip 98 (see FIG. 12) of the ISF tool 96 (see FIG. 12), and to account for a blank sheet thickness 93 (see FIG. 2A).

As shown in FIG. 1B, the computer implemented method 40 further comprises the step of performing 46, with the computer 64 and the slope synchronized tool path application 110 (see FIGS. 2A-2B), a slope synchronized tool path application execution 112 (see FIG. 2A). As shown in FIG. 1B, the slope synchronized tool path application execution 112 comprises the sub step of defining 48 a plurality of horizontal planes 118 (see FIG. 2A) equally spaced apart at a plurality of Z values 114 (see FIG. 2A) along a Z-axis 116 (see FIG. 2A). Each of the plurality of horizontal planes 118 intersects the surface mesh 82 of polygons 84 that approximates or represents the three-dimensional geometry 78 of the aircraft contoured part 38.

As shown in FIG. 1B, the slope synchronized tool path application execution 112 further comprises the substep of determining 50, for each of the plurality of horizontal planes 118, a slope factor 122 (see FIG. 2A) based on a maximal Z-axis component 126b (see FIG. 2A) of a normal vector 128 (see FIG. 2A) for each polygon 84 intersecting each of the plurality of horizontal planes 118, to define a lookup table 134 (see FIG. 2A) of Z values 114 (see FIG. 2A) and slope factor values 124 (see FIG. 2A) that correspond to the Z values 114.

As shown in FIG. 1B, the slope synchronized tool path application execution 112 further comprises the substep of setting 52 an initial Z coordinate 136a (see FIG. 2A) corresponding to a starting portion 88a (see FIG. 4) of the surface mesh 82 (see FIG. 4), as a current Z coordinate 136b (see FIG. 2A).

As shown in FIG. 1B, the slope synchronized tool path application execution 112 then iteratively comprises the substep of calculating 54 a stepdown 140 (see FIG. 2A) as a percentage 142a (see FIG. 2A) of a maximum stepdown 142 (see FIG. 2A) to obtain a calculated stepdown 146 (see FIG. 2A), the percentage 142a based on a current slope factor 122a (see FIG. 2A) for the current Z coordinate 136b, that is calculated based on the lookup table 134 of the Z values 114 and the slope factor values 124 that correspond to the Z values 114; the substep of decrementing 56 the current Z coordinate 136b by the calculated stepdown 146 (see FIG. 2A); and the sub step of determining 57 an intersection 150 (see FIG. 2A) of the surface mesh 82 with a current horizontal plane 118b (see FIG. 2A) at the current Z coordinate 136b, to define a collection 153 (see FIG. 2A) of vectors 154 (see FIG. 2A) in the current horizontal plane 118b, and sorting the collection 153 of vectors 154 to be in a tip-to-tail arrangement 156 (see FIG. 2A), to produce a contour loop 158 (see FIG. 2A), such as a contour tool path loop 160 (see FIG. 2A), for the current Z coordinate 136b, wherein the slope synchronized tool path application 110 creates a plurality of contour tool path loops 160a (see FIG. 2A) that are each respectively spaced apart by slope synchronized stepdowns 148 (see FIG. 2A), to obtain the series of slope synchronized tool paths 32 (see FIG. 2A).

The substep of calculating 54 the stepdown 140 may further comprise, calculating the current slope factor 122a for the current Z coordinate 136b using interpolation 166 (see FIG. 2A), when the current Z coordinate 136b is between two adjacent Z values 114b of the Z values 114 defined or stored in the lookup table 134 (see FIG. 2A).

The sub step of calculating 54 the stepdown 140, i.e., $\Delta Z$, as the minimum stepdown 144 plus (the maximum stepdown 142 minus the minimum stepdown 144) multiplied by a quantity of 1 (one) minus the current slope factor 122a, to obtain the calculated stepdown 146 (see FIG. 2A), that is, ($\Delta Z$ (delta Z, i.e., stepdown)=minimum stepdown+(maximum stepdown−minimum stepdown)×(1.0−slope factor)). The substep of calculating 54 the stepdown 140 may further comprise, adjusting the calculated stepdown 146 to be equal to a minimum stepdown 144 (see FIG. 2A), if the calculated stepdown 146 is less than the minimum stepdown 144.

As shown in FIG. 1B, the computer implemented method 40 further comprises the step of sending 58 an output file 168 (see FIG. 2A), using the computer 64, to a numerically controlled ISF machine 94 (see FIG. 2A), which causes the numerically controlled ISF machine 94 to direct an ISF tool 96 (see FIG. 12) along the series of slope synchronized tool paths 32 comprising the plurality of contour tool path loops 160a spaced apart by the slope synchronized stepdowns 148, to incrementally form the aircraft contoured part 38.

Now referring to FIG. 2A, FIG. 2A shows the computer implemented system 60 for generating a series of slope synchronized tool paths 32 for ISF 34 of a contoured part 36. The contoured part 36 may comprise an aircraft contoured part 38 (see FIG. 2A) for use in an aircraft 250a (see FIG. 14).

As shown in FIG. 2A, the computer implemented system 60 comprises a computer 64 having a processor device 66 and a modeling application 70 implemented by a computer readable software program 72 (see FIG. 2B), such as a first computer readable software program 72a (see FIG. 2B), and executed by the computer 64.

As shown in FIG. 2A, the modeling application 70 is adapted or configured to perform, and performs, a surface discretization 74 of a three-dimensional geometry 78 (see FIGS. 3, 4) of the contoured part 36, such as the aircraft contoured part 38, to produce a surface mesh 82 of polygons 84 that approximates or represents the three-dimensional geometry 78 of the contoured part 36. As shown in FIG. 2A, the plurality, or collection, of polygons may comprise one or more of, triangles 84a, quadrilaterals 84b, pentagons 84c, hexagons 84d, another suitable polygon 84 or polygonal shape, or a combination of the polygons 84, that approximates or represents the three-dimensional geometry 78 of the aircraft contoured part 38. As shown in FIG. 4, the surface mesh 82, has extreme ends 86, such as a starting portion 88a, for example, a top-most portion or another portion of the surface mesh 82, and an ending portion 88b, for example, a bottom-most portion or another portion of the surface mesh 82.

The modeling application 70 preferably generates an offset surface 90 (see FIG. 3) spaced a constant offset distance 92 (see FIG. 3) from the surface 80 (see FIGS. 2A, 3), such as the surface mesh 82 (see FIGS. 2A, 4), that approximates or represents the three-dimensional geometry 78 (see FIG. 3), of the part 35 (see FIGS. 2A, 3), such as the contoured part 36 (see FIGS. 2A, 3), for example, the aircraft contoured part 38 (see FIGS. 2A, 14), to account for an incremental sheet forming (ISF) tool tip radius 100 (see FIG. 12) of an incremental sheet forming (ISF) tool tip 98 (see FIG. 12) of ISF tool 96 (see FIG. 12), and to account for the blank sheet thickness 93 (see FIG. 2A).

As shown in FIG. 2A, the computer implemented system 60 further comprises a slope synchronized tool path application 110 implemented by a computer readable software program 72 (see FIG. 2B), such as a second computer readable software program 72b (see FIG. 2B), and executed by the computer 64.

The slope synchronized tool path application 110 is adapted to, or configured to, define, and defines a plurality of equally spaced apart Z values 114a (see FIG. 2A) along a Z-axis 116 (see FIG. 2A), where each of the plurality of equally spaced apart Z values 114a intersects the surface mesh 82 of polygons 84 that approximates or represents the three-dimensional geometry 78 of the contoured part 36, such as the aircraft contoured part 38.

The slope synchronized tool path application 110 is further adapted to, or configured to, determine, and determines, for each of the plurality of equally spaced apart Z values 114a, a slope factor 122 (see FIG. 2A) based on a maximal Z-axis component 126b (see FIG. 2A) of a normal vector 128 (see FIG. 2A), for each polygon 84 intersecting each of the plurality of equally spaced apart Z values 114a, to define an array 130 (see FIG. 2A), or a function 132 (see FIG. 2A), of Z values 114 (see FIG. 2A) and slope factor values 124 (see FIG. 2A) that correspond to the Z values 114, respectively. The array 130 may be in the form of a lookup table 134 (see FIG. 2A) of the Z values 114 and the slope factor values 124 corresponding to the Z values 114, respectively. FIG. 2A further shows a slope 121 used for the slope factor 122. The slope 121 is the minimal slope at the Z level.

The slope synchronized tool path application 110 is further adapted to, or configured to, set, and sets, an initial Z coordinate 136a (see FIG. 2A) corresponding to a starting portion 88a (see FIG. 4) of the surface mesh 82 (see FIG. 4), as a current Z coordinate 136b (see FIG. 2A).

The slope synchronized tool path application 110 is then iteratively: adapted to, or configured to, calculate, and calculates, a stepdown 140 (see FIG. 2A) as a percentage 142a (see FIG. 2A) of a maximum stepdown 142 (see FIG. 2A) to obtain a calculated stepdown 146 (see FIG. 2A), the percentage 142a based on a current slope factor 122a (see FIG. 2A) for the current Z coordinate 136b, that is calculated based on the array 130 of the Z values 114 and the slope factor values 124 that correspond to the Z values 114, respectively; adapted to, or configured to, decrement, and decrements, the current Z coordinate 136b by the calculated stepdown 146 (see FIG. 2A); and adapted to, or configured to, determine, and determines, an intersection 150 (see FIG. 2A) of the surface mesh 82 with a horizontal plane 118a (see FIG. 2A), or a level plane 120a (see FIG. 2A), at the current Z coordinate 136b, to define a collection 153 (see FIG. 2A) of vectors 154 (see FIG. 2A) in the horizontal plane 118a, to produce a contour loop 158 (see FIG. 2A), such as a contour tool path loop 160 (see FIG. 2A), for the current Z coordinate 136b, wherein the slope synchronized tool path application 110 creates a plurality of contour tool path loops 160a (see FIG. 2A) that are each respectively spaced apart by slope synchronized stepdowns 148 (see FIG. 2A), to obtain the series of slope synchronized tool paths 32.

The current slope factor 122a for the current Z coordinate 136b may be calculated using interpolation 166 (see FIG. 2A), when the current Z coordinate 136b is between two adjacent Z values 114b (see FIG. 2A) of the Z values 114 defined in the array 130 or the lookup table 134.

The stepdown 140, i.e., $\Delta Z$, is preferably calculated as the minimum stepdown 144 plus (the maximum stepdown 142 minus the minimum stepdown 144) multiplied by a quantity of 1 (one) minus the current slope factor 122a, to obtain the calculated stepdown 146 (see FIG. 2A), that is, ($\Delta Z$ (delta Z, i.e., stepdown)=minimum stepdown+(maximum stepdown−minimum stepdown)×(1.0−slope factor)), and further wherein the calculated stepdown 146 is adjusted to be equal to a minimum stepdown 144 (see FIG. 2A), if the calculated stepdown 146 is less than the minimum stepdown 144. The collection 153 of vectors 154 is preferably sorted in a tip-to-tail arrangement 156 (see FIG. 2A), to produce the contour tool path loop 160 for the current Z coordinate 136b.

The computer 64 sends an output file 168 (see FIG. 2A) to a numerically controlled ISF machine 94 (see FIG. 2A). This causes the numerically controlled ISF machine 94 to direct an ISF tool 96 (see FIG. 12) along the series of slope synchronized tool paths 32 (see FIG. 2A) comprising the plurality of contour tool path loops 160a (see FIG. 2A) spaced apart by the slope synchronized stepdowns 148 (see FIG. 2A), to incrementally form the contoured part 36 (see FIGS. 2A, 3), such as the aircraft contoured part 38 (see FIGS. 2A, 14). As shown in FIG. 2A, the output file 168 may comprise an incremental sheet forming (ISF) command file 168a, which may be in the format of G-code, or another suitable output file 168.

Now referring to FIG. 2B, FIG. 2B is an illustration of a functional block diagram showing an exemplary computer system 62 that may be used with the computer implemented method 10, the computer implemented method 40, and the computer implemented system 60 of the disclosure.

As shown in FIG. 2B, the computer system 62 comprises a computer assembly 169 comprising one or more computers 64, which may include one or more processor devices 66, and an operating system 68. As shown in FIG. 2B, the computer assembly 169 of the computer system 62 further comprises storage devices 170, such as a computer memory 172 and a persistent storage 174. The computer memory 172 may comprise one or more of a random access memory (RAM), including dynamic and/or static RAM, on-chip or off-chip cache memory, or other suitable computer memory 172. The persistent storage 174 may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage 174.

As shown in FIG. 2B, the computer assembly 169 of the computer system 62 may further comprise one or more computer communications device(s) 176, such as one or more network communications device(s) 178, for linking the computer implemented system 60, for example, to one or more separate systems. The one or more network communications device(s) 178 may comprise network links between various computers and devices connected together within a network data processing system via wire connections, wireless communication links, fiber optic cables, or other suitable network connections, and that may connect to a network, a server, the Internet, or another system or device.

The one or more computer communications device(s) 176 may be configured to provide for communications in accordance with any of a number of wired or wireless communication standards. The one or more computer(s) 64, or one or more processor device(s) 66, may also be configured to facilitate communications via the one or more computer communications device(s) 176, for example, controlling hardware included within the one or more computer communications device(s) 176). The one or more computer communications device(s) 176 may include, for example, one or more antennas, a transmitter, a receiver, a transceiver and/or supporting hardware, including, for example, a processor for enabling communications.

As shown in FIG. 2B, the computer assembly of the computer system 62 further comprises one or more input/output unit(s) 180, a display 182, and a power supply 184. The one or more input/output unit(s) 180 provide for the input and output of data with other devices connected to the computer system 62, such as computer interfaces. The one or more input/output unit(s) 180 may comprise such devices as a keyboard, a mouse, a joystick, or other input/output devices. For example, the one or more input/output unit(s) 180 may provide a connection for user input though a keyboard and mouse, or may send output to a printer or other device. The display 182 provides the means to display data or information to a user, one or more separate automated systems, automated computer programs, automated apparatuses, or automated devices, or another suitable separate system, program, or device. The power supply 184 of the computer system 62 may comprise batteries, electricity, or other power supply elements.

As shown in FIG. 2B, the computer assembly 169 of the computer system 62 further comprises a data bus 186 that transfers data between the one or more computers 64, the storage devices 170, the one or more computer communications devices 176, the one or more input/output units 180, and the display 182. The data bus 186 may include hardware components such as wires, optical fibers, and other hardware devices, and may include software components such as communications protocols or other software devices.

As shown in FIG. 2B, the computer system 62 further comprises a computer program product 188 that may be loaded into the computer assembly 169 of the computer system 62, via a loading mechanism 190, or other suitable mechanism. The computer program product 188 (see FIG. 2B) may comprise a system logic 192 (see FIG. 2B).

As shown in FIG. 2B, the system logic 192 comprises computer readable software programs 72, including the first computer readable software program 72a, that implements the modeling application 70, and the second computer readable software program 72b, that implements the slope synchronized tool path application 110. The one or more computer(s) 64 (see FIG. 2B) may be configured to control, and control, one or more functions of one or more elements of the computer implemented system 60 (see FIG. 2A) through computer program instructions, such as the computer readable software programs 72 (see FIG. 2B) stored on the computer memory 172 (see FIG. 2B), accessible to the one or more computer(s) 64 (see FIG. 2B), and/or the one or more processor device(s) 66 (see FIG. 2B). The slope synchronized tool path application 110 (see FIG. 2B) implements a slope synchronized tool path algorithm 198 (see FIG. 2B).

As shown in FIG. 2B, the computer program product 188 further comprises a computer readable medium 194. The computer readable medium 194 (see FIG. 2B) may comprise a computer readable storage media 196 (see FIG. 2B), or another suitable computer readable medium 194 (see FIG. 2B).

The system logic 192 (see FIG. 2B), such as the computer readable software programs 72 (see FIG. 2B), including the modeling application 70 (see FIG. 2B) and the slope synchronized tool path application 110 (see FIG. 2B), may be stored in, and retrieved from, the computer readable storage media 196 (see FIG. 2B) and loaded into the computer assembly 169 (see FIG. 2B), and into the one or more computer(s) 64 (see FIG. 2B), the one or more processor device(s) 66, or other programmable device, to configure and direct the one or more computer(s) 64, the one or more processor device(s) 66, or other programmable device to execute operations to be performed on, or by, the one or more computer(s) 64, the one or more processor device(s) 66, or other programmable device, and to function in a particular way. Execution of the system logic 192, such as the computer readable software programs 72, including the modeling application 70 and the slope synchronized tool path application 110, may execute the computer implemented system 60 (see FIG. 2A), the computer implemented method 10 (see FIG. 1A), and the computer implemented method 40 (see FIG. 1B), such that the system logic 192, such as the computer readable software programs 72 (see FIG. 2B), including the modeling application 70 (see FIG. 2B) and the slope synchronized tool path application 110 (see FIG. 2B), executed by the one or more computer(s) 64, one or more processor device(s) 66, or other programmable device, provide operations for implementing the functions disclosed herein.

Now referring to FIG. 3, FIG. 3 is an illustration of a bottom perspective view of a model 79 of a part 35, such as a contoured part 36, and an offset surface 90. As shown in FIG. 3, the modeling application 70 (see FIG. 2A) may generate, or be adapted to, or configured to, generate, the offset surface 90 spaced a constant offset distance 92 from the surface 80 of the three-dimensional geometry 78, of the model 79 of the part 35, such as the contoured part 36. FIG. 3 shows the offset surface 90, which is generated from the surface 80 of the part 35, such as the contoured part 36, with the constant offset distance 92 between the surface 80 and the offset surface 90.

Now referring to FIG. 4, FIG. 4 is an illustration of a top perspective view of the surface mesh 82 of the model 79 of the part 35, such as the contoured part 36. The modeling application 70 (see FIG. 2A) is adapted to perform, and performs, the surface discretization 74 (see FIG. 2A), for example, the surface tessellation 76 (see FIG. 2A), also referred to as the surface mesh 82 (see FIG. 4), of the surface 80 (see FIG. 4) of the model 79 (see FIG. 4) of the contoured part 36 (see FIG. 4). FIG. 4 shows the surface mesh 82 comprising the plurality, or collection, of polygons 84, in the form of quadrilaterals 84b, that approximate or represent the three-dimensional geometry 78 of the model 79 of the contoured part 36. As shown in FIG. 4, the surface 80, such as in the form of the surface mesh 82, has extreme ends 86, such as a starting portion 88a and an ending portion 88b. FIG. 4 further shows a three-dimensional coordinate axis system 200 with an X-axis 202, a Y-axis 204, and the Z-axis 116.

Figure 5A:
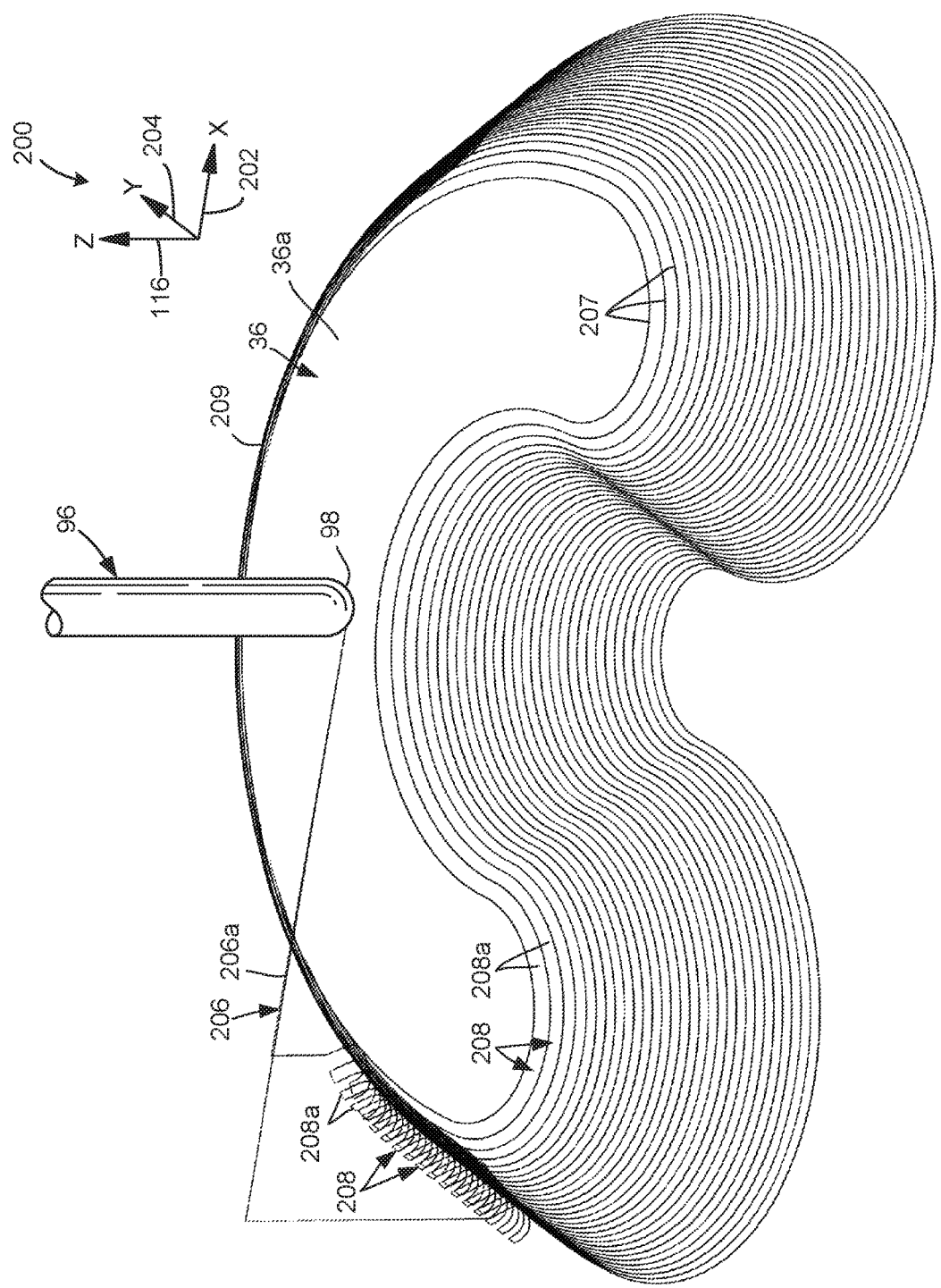
FIG. 5A is an illustration of an isometric view of a known constant stepdown tool path for a first contoured part.

Now referring to FIG. 5A, FIG. 5A is an illustration of an isometric view of a known constant stepdown tool path 206, such as a first constant stepdown tool path 206a, for a contoured part 36, such as a first contoured part 36a. The contoured part 36, such as the first contoured part 36a, has a three-dimensional raised C-shape 209 (see FIG. 5A). FIG. 5A shows the known constant stepdown tool path 206, such as the first constant stepdown tool path 206a, with a plurality of constant stepdowns 208, or fixed stepdowns, such as a plurality of first constant stepdowns 208a, between a plurality of tool path loops 207. Each constant stepdown 208, such as each first constant stepdown 208a, may have, for example, a 5 mm (millimeter) distance between two adjacent tool path loops 207. FIG. 5A further shows the ISF tool 96 with the ISF tool tip 98 and shows the three-dimensional coordinate axis system 200 with the X-axis 202, the Y-axis 204, and the Z-axis 116. The known constant stepdown tool path 206, such as the first constant stepdown tool path 206a, distributes the action of this tool path uniformly in a Z-direction.

Figure 5B:
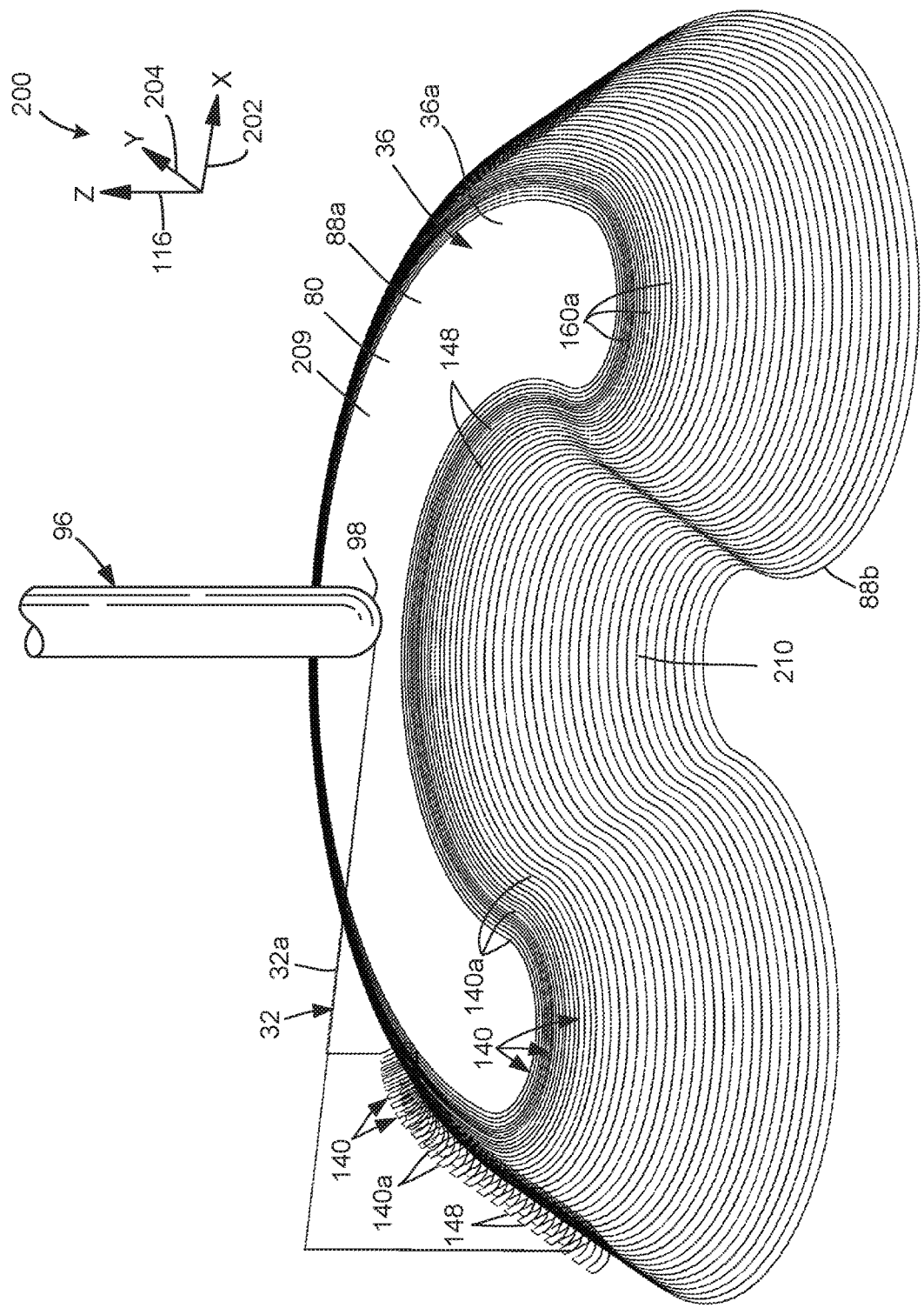
FIG. 5B is an illustration of an isometric view of a slope synchronized tool path of the disclosure for a first contoured part.

Now referring to FIG. 5B, FIG. 5B is an illustration of an isometric view of a slope synchronized tool path 32, such as a first slope synchronized tool path 32a, of the disclosure, for a contoured part 36, such as a first contoured part 36a. The contoured part 36, such as the first contoured part 36a, has the three-dimensional raised C-shape 209 (see FIG. 5B). FIG. 5B shows the slope synchronized tool path 32, such as the first slope synchronized tool path 32a, with a plurality of stepdowns 140, such as a plurality of first stepdowns 140a, between a plurality of contour tool path loops 160a. Preferably, the plurality of stepdowns 140, such as the plurality of first stepdowns 140a, comprise slope synchronized stepdowns 148 (see FIG. 5B), where the slope synchronized stepdowns 148 are spaced closer together and spaced a smaller distance apart at or near the starting portion 88a of the surface 80 of the contoured part 36, and where the slope synchronized stepdowns 148 are spaced farther apart and at a greater distance apart at or near the ending portion 88b (see FIG. 5B) and along a body portion 210 (see FIG. 5B) of the contoured part 36. The plurality of stepdowns 140 (see FIG. 5B), such as the plurality of first stepdowns 140a (see FIG. 5B), for example, the slope synchronized stepdowns 148 (see FIG. 5B), may preferably each have a distance between two adjacent contour tool path loops 160a in a range of 0.5 mm (millimeter) to 10.0 mm.

FIG. 5B further shows the ISF tool 96 with the ISF tool tip 98 forming the slope synchronized tool path 32, such as the first slope synchronized tool path 32a. FIG. 5B further shows the three-dimensional coordinate axis system 200 with the X-axis 202, the Y-axis 204, and the Z-axis 116. The ISF tool 96 forms the slope synchronized tool path 32, such as the first slope synchronized tool path 32a, by looping downwardly along the Z-axis 116.

Figure 6A:
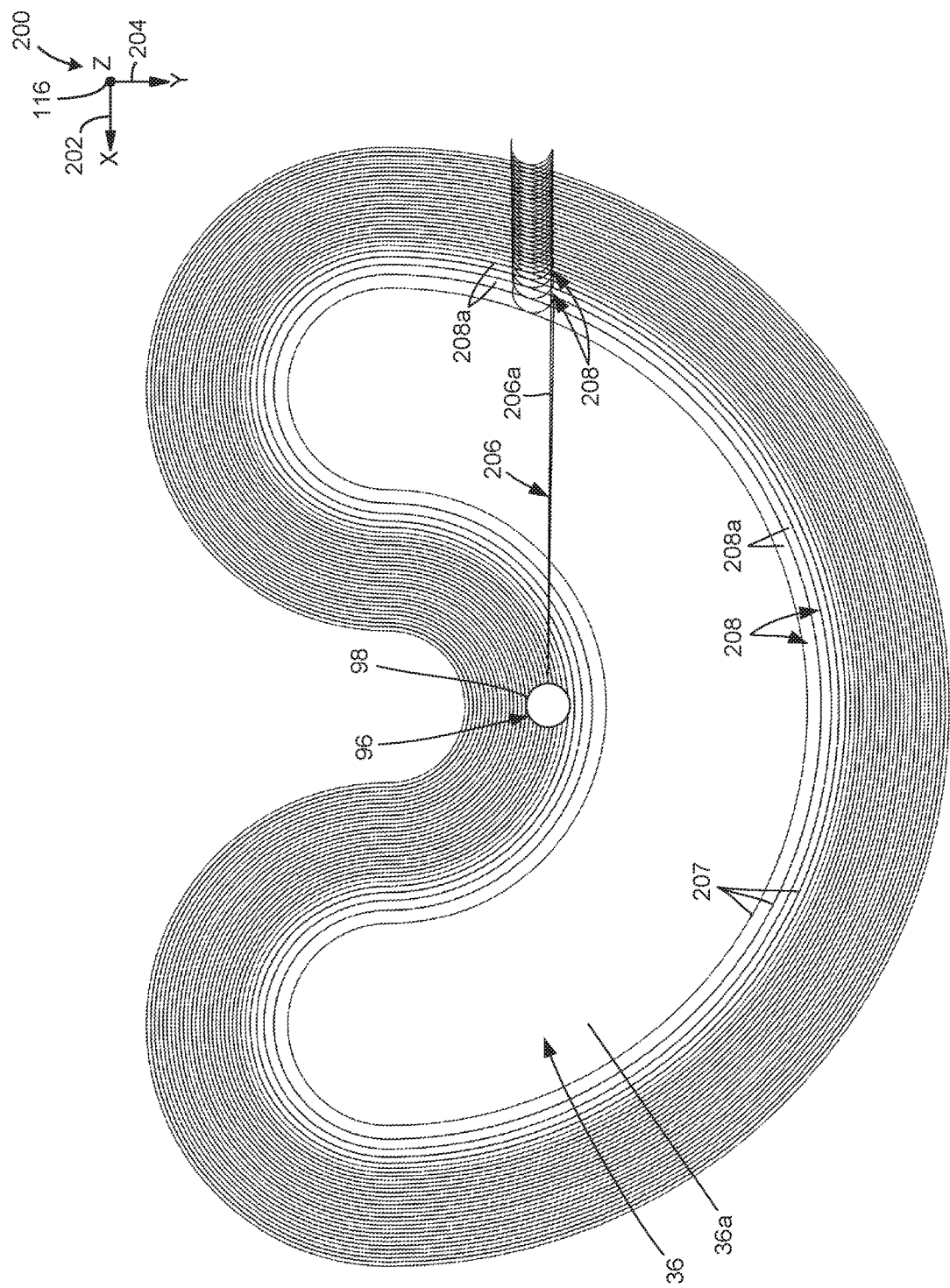
FIG. 6A is an illustration of a top view of the known constant stepdown tool path of FIG. 5A.

Now referring to FIG. 6A, FIG. 6A is an illustration of a top view of the known constant stepdown tool path 206, such as the first constant stepdown tool path 206a, of FIG. 5A, for the contoured part 36, such as the first contoured part 36a. FIG. 6A shows the known constant stepdown tool path 206, such as the first constant stepdown tool path 206a, with the plurality of constant stepdowns 208, or fixed stepdowns, such as the plurality of first constant stepdowns 208a, between the plurality of tool path loops 207. FIG. 6A further shows the ISF tool 96 with the ISF tool tip 98 and shows the three-dimensional coordinate axis system 200 with the X-axis 202, the Y-axis 204, and the Z-axis 116 point, as the Z-axis 116 is coming out of the page.

Figure 6B:
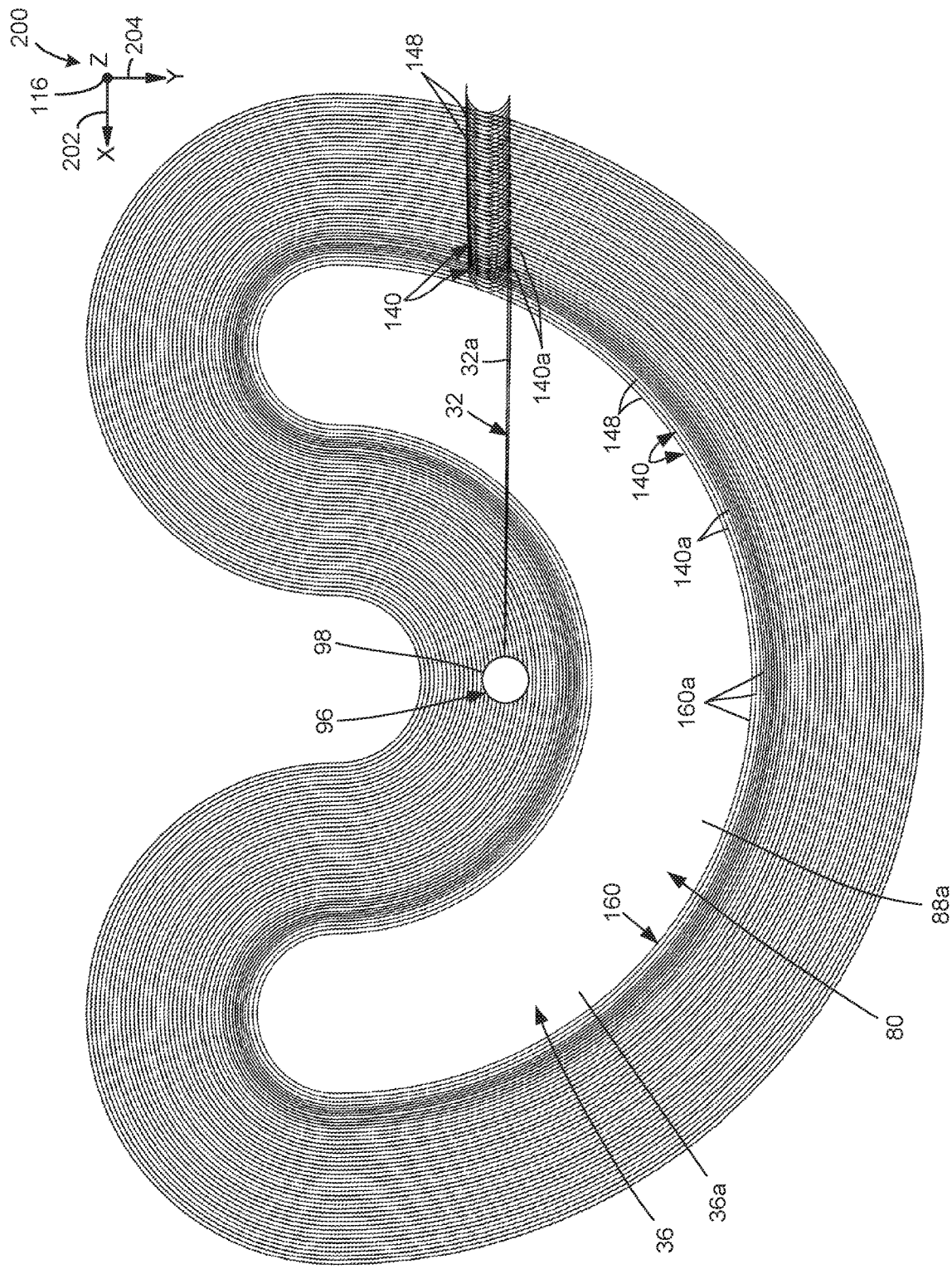
FIG. 6B is an illustration of a top view of the slope synchronized tool path of FIG. 5B.

Now referring to FIG. 6B, FIG. 6B is an illustration of a top view of the slope synchronized tool path 32, such as the first slope synchronized tool path 32a, of FIG. 5B, for the contoured part 36, such as the first contoured part 36a. FIG. 6B shows the slope synchronized tool path 32, such as the first slope synchronized tool path 32a, with the plurality of stepdowns 140, such as the plurality of first stepdowns 140a, between the plurality of contour tool path loops 160a. Preferably, the plurality of stepdowns 140, such as the plurality of first stepdowns 140a, comprise slope synchronized stepdowns 148 (see FIG. 6B), where the slope synchronized stepdowns 148 are spaced closer together and spaced a smaller distance apart at or near the starting portion 88a of the surface 80 of the contoured part 36, and where the slope synchronized stepdowns 148 are spaced farther apart and at a greater distance apart at or near the ending portion 88b (see FIG. 6B) and along the body portion 210 (see FIG. 6B) of the contoured part 36. FIG. 6B further shows the ISF tool 96 with the ISF tool tip 98 forming the slope synchronized tool path 32, such as the first slope synchronized tool path 32a. FIG. 6B further shows the three-dimensional coordinate axis system 200 with the X-axis 202, the Y-axis 204, and the Z-axis 116 point, as the Z-axis 116 is coming out of the page.

Figure 7A:
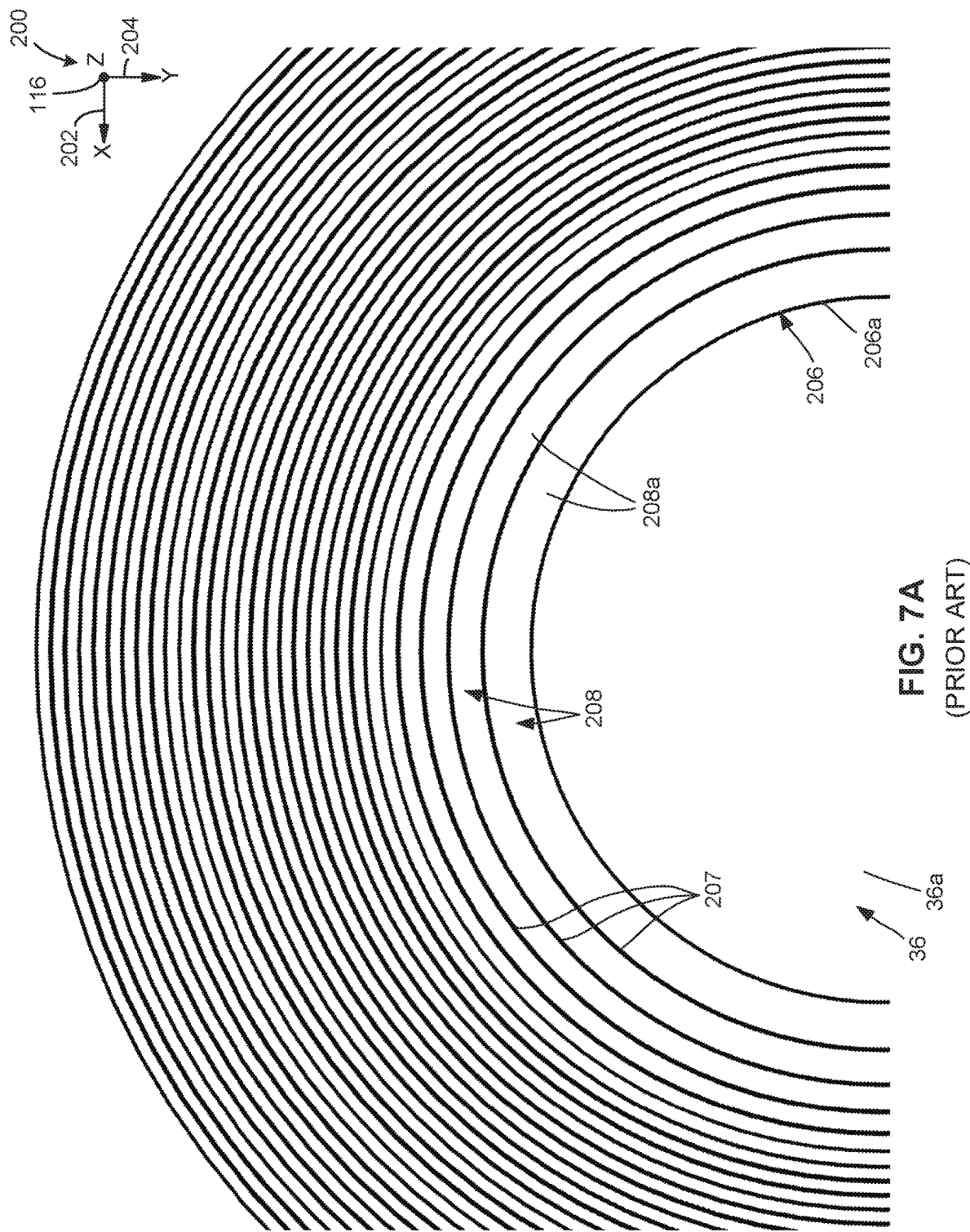
FIG. 7A is an illustration of a top view of an enlarged portion of the known constant stepdown tool path of FIG. 6A.

Now referring to FIG. 7A, FIG. 7A is an illustration of a top view of an enlarged portion of the known constant stepdown tool path 206, such as the first constant stepdown tool path 206a, of FIG. 6A, for the contoured part 36, such as the first contoured part 36a. FIG. 7A shows the known constant stepdown tool path 206, such as the first constant stepdown tool path 206a, with the plurality of constant stepdowns 208, or fixed stepdowns, such as the plurality of first constant stepdowns 208a, between the plurality of tool path loops 207. FIG. 7A further shows the three-dimensional coordinate axis system 200 with the X-axis 202, the Y-axis 204, and the Z-axis 116 point, as the Z-axis 116 is coming out of the page.

Figure 7B:
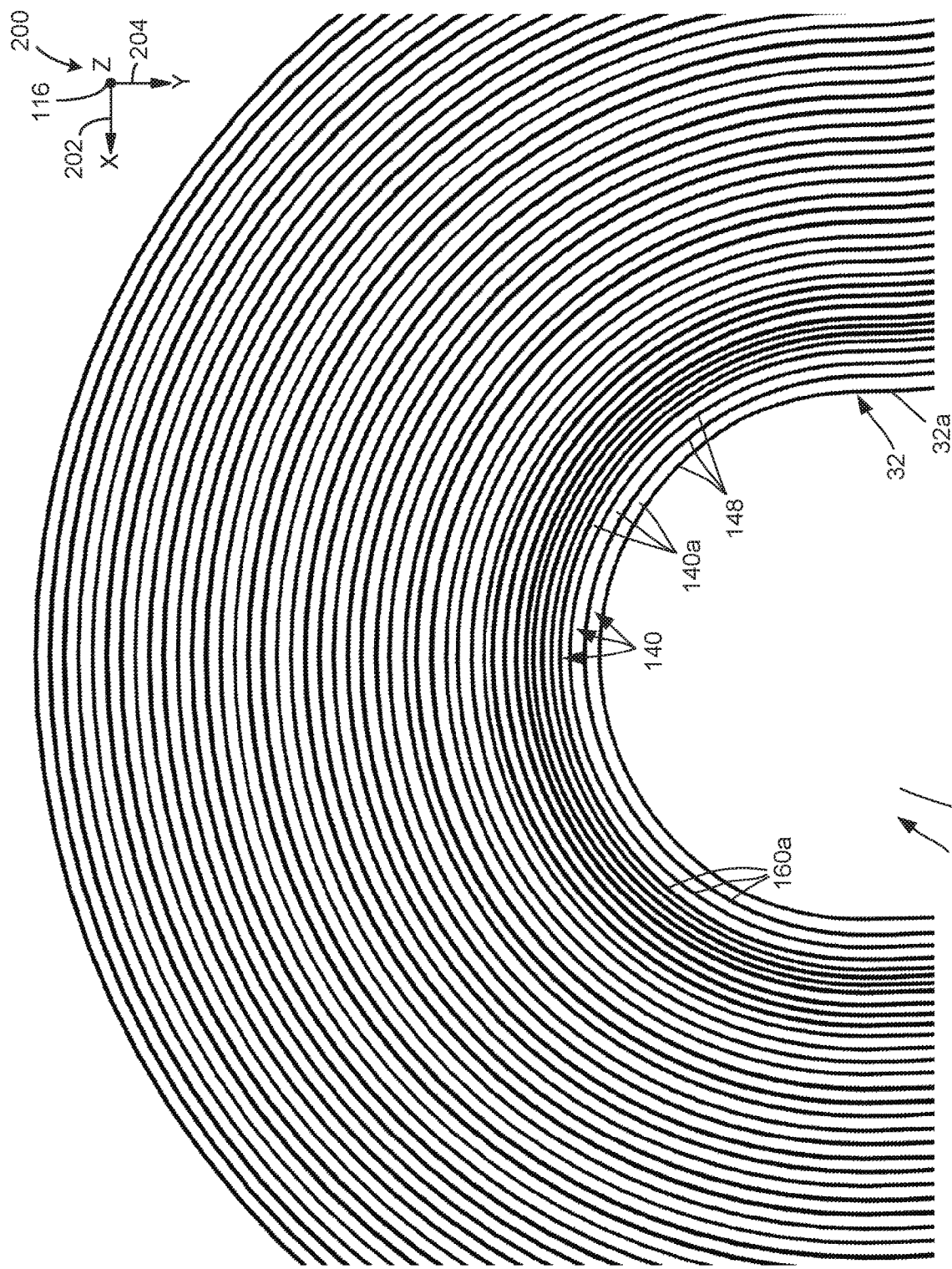
FIG. 7B is an illustration of a top view of an enlarged portion of the slope synchronized tool path of FIG. 6B.

Now referring to FIG. 7B, FIG. 7B is an illustration of a top view of an enlarged portion of the slope synchronized tool path 32, such as the first slope synchronized tool path 32a, of FIG. 6B, for the contoured part 36, such as the first contoured part 36a. FIG. 7B shows the slope synchronized tool path 32, such as the first slope synchronized tool path 32a, with the plurality of stepdowns 140, such as the plurality of first stepdowns 140a, between the plurality of contour tool path loops 160a. Preferably, the plurality of stepdowns 140, such as the plurality of first stepdowns 140a, comprise slope synchronized stepdowns 148 (see FIG. 7B). FIG. 7B further shows the three-dimensional coordinate axis system 200 with the X-axis 202, the Y-axis 204, and the Z-axis 116 point, as the Z-axis 116 is coming out of the page.

Figure 8A:
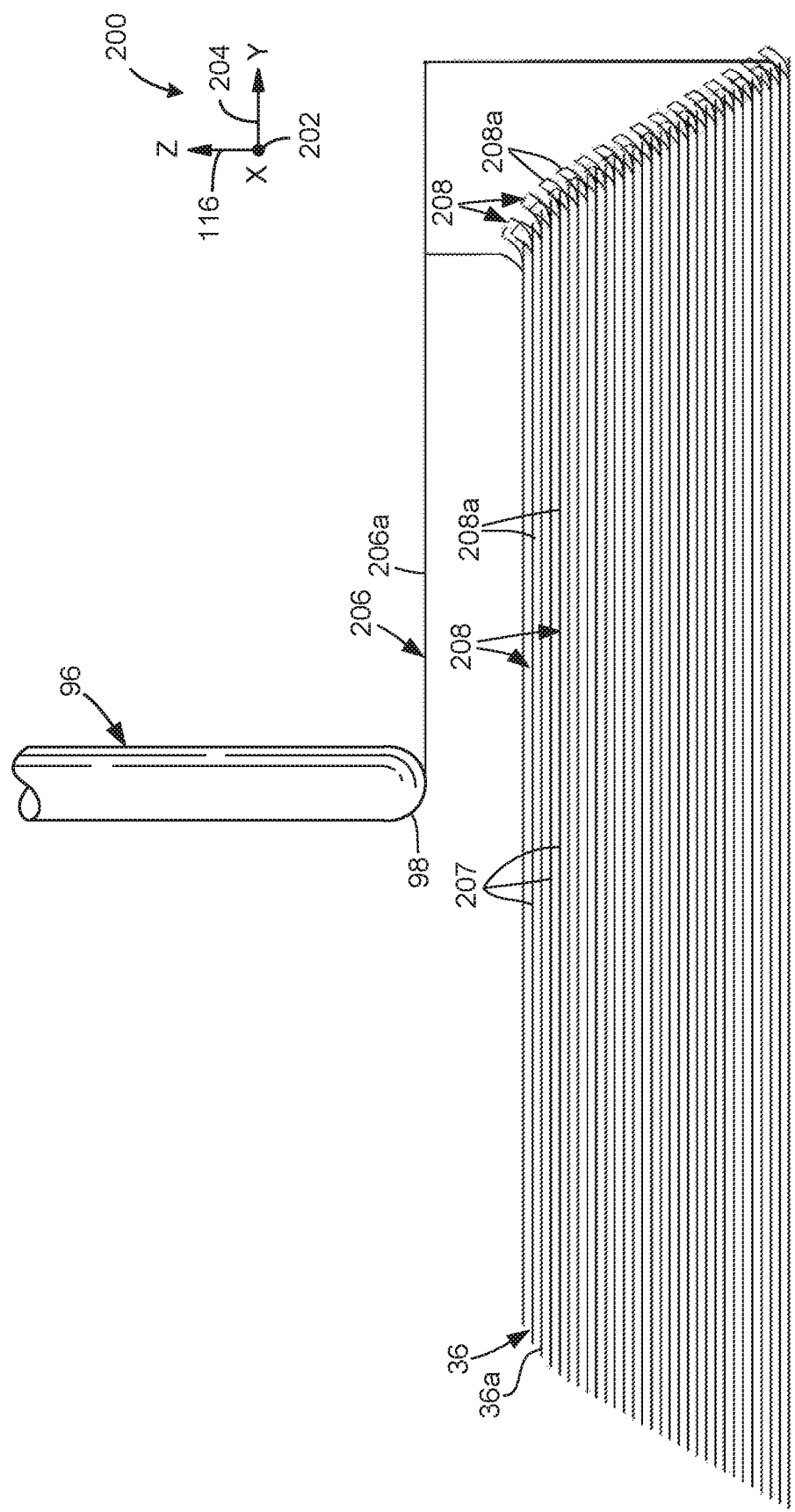
FIG. 8A is an illustration of a front view of the known constant stepdown tool path of FIG. 5A.

Now referring to FIG. 8A, FIG. 8A is an illustration of a front view of the known constant stepdown tool path 206, such as the first constant stepdown tool path 206a, of FIG. 5A, for the contoured part 36, such as the first contoured part 36a. FIG. 8A shows the known constant stepdown tool path 206, such as the first constant stepdown tool path 206a, with the plurality of constant stepdowns 208, or fixed stepdowns, such as the plurality of first constant stepdowns 208a, between the plurality of tool path loops 207. FIG. 8A further shows the ISF tool 96 with the ISF tool tip 98, and shows the three-dimensional coordinate axis system 200 with the X-axis 202 point, as the X-axis 202 is coming out of the page, the Y-axis 204, and the Z-axis 116.

Figure 8B:
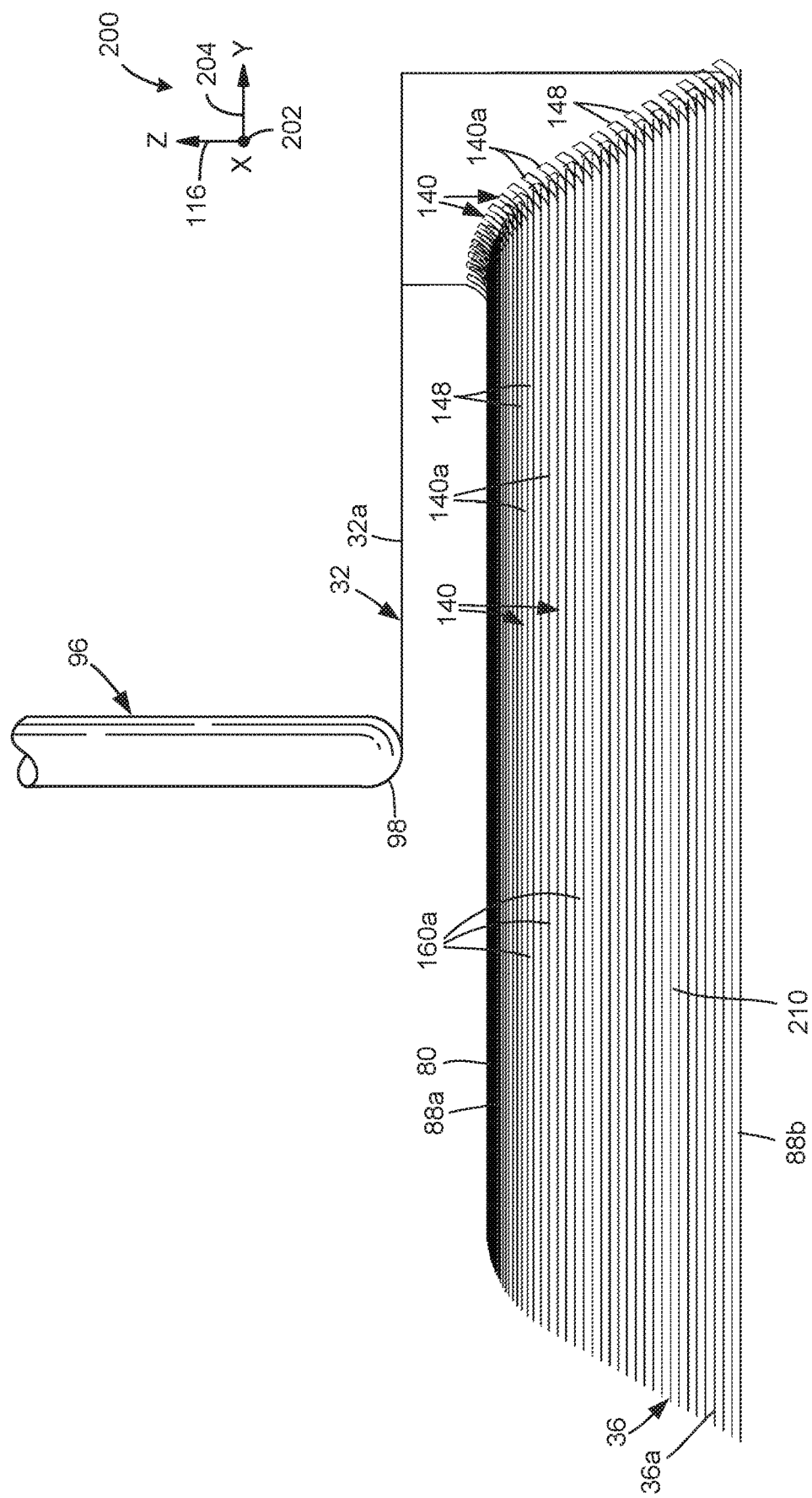
FIG. 8B is an illustration of a front view of the slope synchronized tool path of FIG. 5B.

Now referring to FIG. 8B, FIG. 8B is an illustration of a front view of the slope synchronized tool path 32, such as a first slope synchronized tool path 32a, of FIG. 5B, for the contoured part 36, such as the first contoured part 36a. FIG. 8B shows the slope synchronized tool path 32, such as the first slope synchronized tool path 32a, with the plurality of stepdowns 140, such as the plurality of first stepdowns 140a, between the plurality of contour tool path loops 160a. Preferably, the plurality of stepdowns 140, such as the plurality of first stepdowns 140a, comprise slope synchronized stepdowns 148 (see FIG. 8B), where the slope synchronized stepdowns 148 are spaced closer together and spaced a smaller distance apart at or near the starting portion 88a of the surface 80 of the contoured part 36, and where the slope synchronized stepdowns 148 are spaced farther apart and at a greater distance apart at or near the ending portion 88b (see FIG. 8B) and along the body portion 210 (see FIG. 8B) of the contoured part 36. FIG. 8B further shows the ISF tool 96 with the ISF tool tip 98. FIG. 8B further shows the three-dimensional coordinate axis system 200 with the X-axis 202 point, as the X-axis 202 is coming out of the page, the Y-axis 204, and the Z-axis 116. The ISF tool 96 forms the slope synchronized tool path 32, such as the first slope synchronized tool path 32a, by looping downwardly along the Z-axis 116.

Figure 9A:
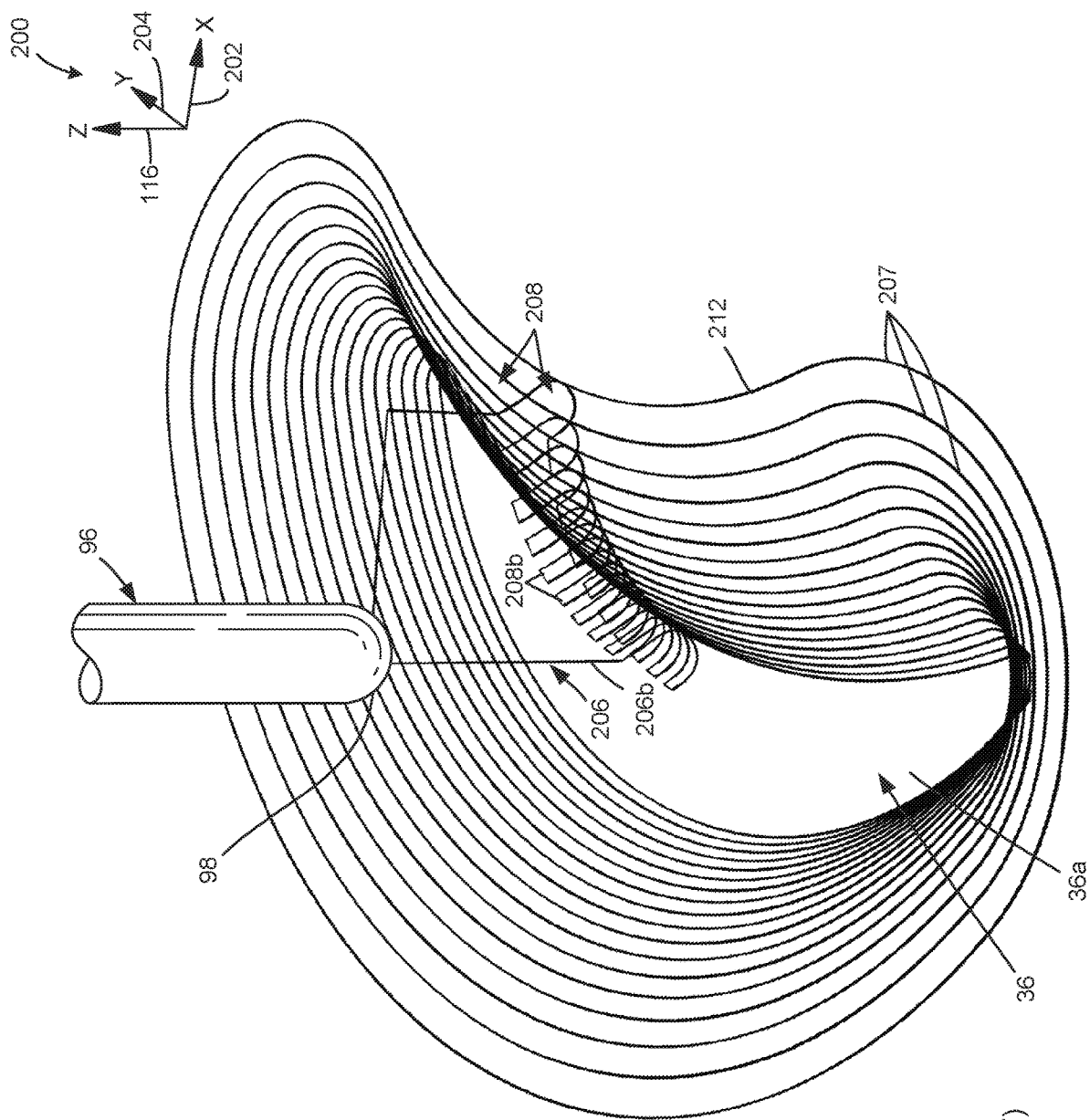
FIG. 9A is an illustration of an isometric view of a known constant stepdown tool path for a second contoured part.

Now referring to FIG. 9A, FIG. 9A is an illustration of an isometric view of a known constant stepdown tool path 206, such as a second constant stepdown tool path 206b, for a contoured part 36, such as a second contoured part 36b. The contoured part 36, such as the second contoured part 36b, has a three-dimensional arc shape 212 (see FIG. 9A). FIG. 9A shows the known constant stepdown tool path 206, such as a second constant stepdown tool path 206b, with a plurality of constant stepdowns 208, or fixed stepdowns, such as a plurality of second constant stepdowns 208b, between the plurality of tool path loops 207. Each constant stepdown 208, such as each second constant stepdown 208b, may have, for example, a 2.0 mm (millimeter) distance between two adjacent tool path loops 207. FIG. 9A further shows the ISF tool 96 with the ISF tool tip 98 forming the known constant stepdown tool path 206, such as the second constant stepdown tool path 206b. FIG. 9A further shows the three-dimensional coordinate axis system 200 with the X-axis 202, the Y-axis 204, and the Z-axis 116. The known constant stepdown tool path 206, such as the second constant stepdown tool path 206b, distributes the action of this tool path uniformly in the Z-direction.

Figure 9B:
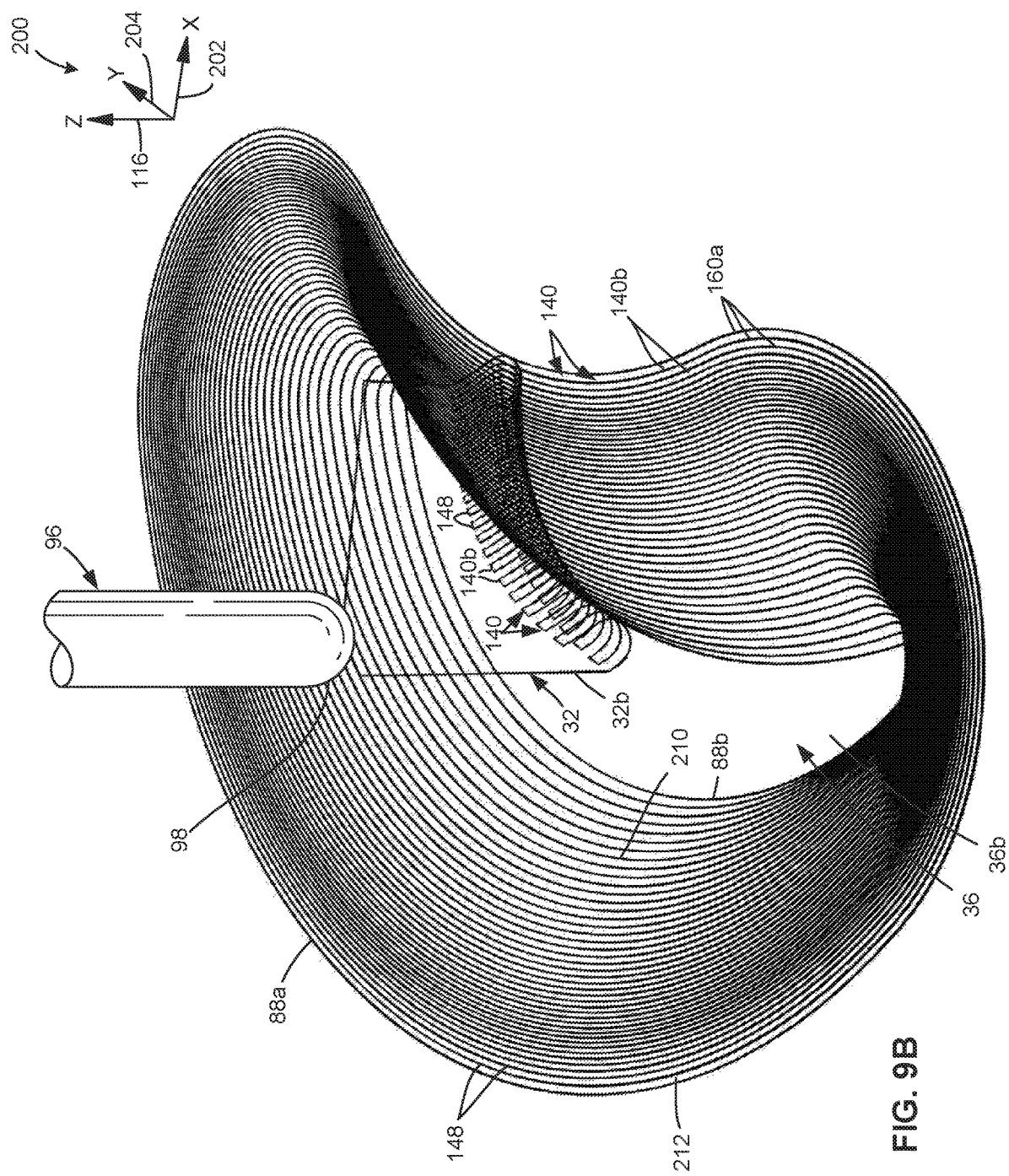
FIG. 9B is an illustration of an isometric view of a slope synchronized tool path of the disclosure for a second contoured part.

Now referring to FIG. 9B, FIG. 9B is an illustration of an isometric view of a slope synchronized tool path 32, such as a second slope synchronized tool path 32b, of the disclosure, for a contoured part 36, such as a second contoured part 36b. The contoured part 36, such as the second contoured part 36b, has the three-dimensional arc shape 212 (see FIG. 9B). FIG. 9B shows the slope synchronized tool path 32, such as the second slope synchronized tool path 32b, with a plurality of stepdowns 140, such as a plurality of second stepdowns 140b, between the plurality of contour tool path loops 160a. Preferably, the plurality of stepdowns 140, such as the plurality of second stepdowns 140b, comprise slope synchronized stepdowns 148 (see FIG. 9B), where the slope synchronized stepdowns 148 are spaced closer together and spaced a smaller distance apart at or near the starting portion 88a of the contoured part 36, and where the slope synchronized stepdowns 148 are spaced farther apart and at a greater distance apart at or near the ending portion 88b (see FIG. 9B) and along the body portion 210 (see FIG. 9B) of the contoured part 36. The plurality of stepdowns 140 (see FIG. 9B), such as the plurality of second stepdowns 140b (see FIG. 9B), for example, the slope synchronized stepdowns 148 (see FIG. 9B), may preferably each have a distance between two adjacent contour tool path loops 160a in a range of 0.10 mm (millimeter) to 8.0 mm.

FIG. 9B further shows the ISF tool 96 with the ISF tool tip 98 forming the slope synchronized tool path 32, such as the second slope synchronized tool path 32b. FIG. 9B further shows the three-dimensional coordinate axis system 200 with the X-axis 202, the Y-axis 204, and the Z-axis 116. The ISF tool 96 forms the slope synchronized tool path 32, such as the second slope synchronized tool path 32b, by looping downwardly along the Z-axis 116.

Figure 10A:
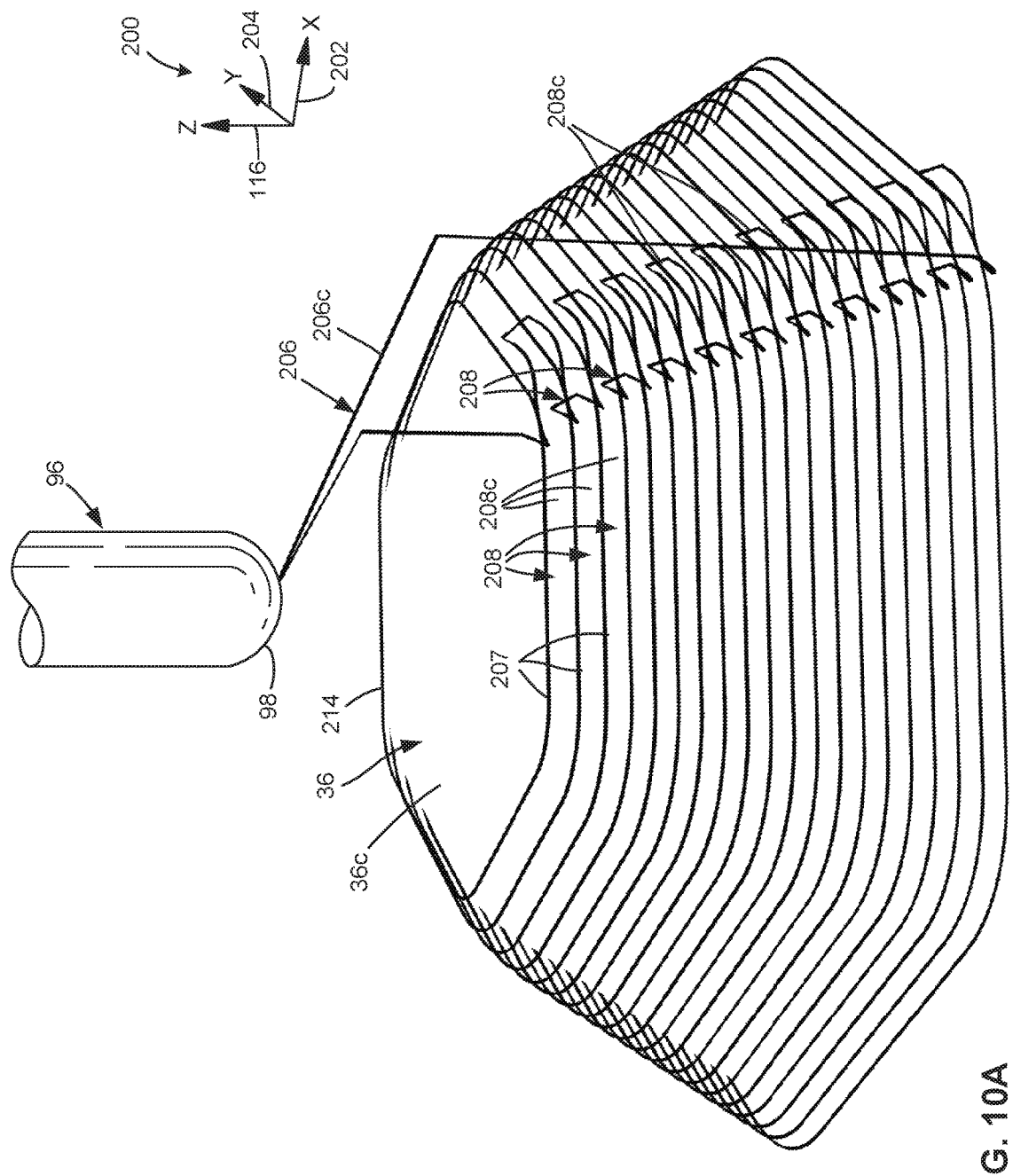
FIG. 10A is an illustration of an isometric view of a known constant stepdown tool path for a third contoured part.

Now referring to FIG. 10A, FIG. 10A is an illustration of an isometric view of a known constant stepdown tool path 206, such as a third constant stepdown tool path 206c, for a contoured part 36, such as a third contoured part 36c. The contoured part 36, such as the third contoured part 36c, has a three-dimensional hexagonal shape 214 (see FIG. 10A). FIG. 10A shows the known constant stepdown tool path 206, such as the third constant stepdown tool path 206c, with a plurality of constant stepdowns 208, or fixed stepdowns, such as a plurality of third constant stepdowns 208c, between the plurality of tool path loops 207. Each constant stepdown 208, such as each third constant stepdown 208c, may have, for example, a 4.0 mm (millimeter) distance between two adjacent tool path loops 207. FIG. 10A further shows the ISF tool 96 with the ISF tool tip 98 forming the known constant stepdown tool path 206, such as the third constant stepdown tool path 206c. FIG. 10A further shows the three-dimensional coordinate axis system 200 with the X-axis 202, the Y-axis 204, and the Z-axis 116. The known constant stepdown tool path 206, such as the third constant stepdown tool path 206c, distributes the action of this tool path uniformly in the Z-direction.

Figure 10B:
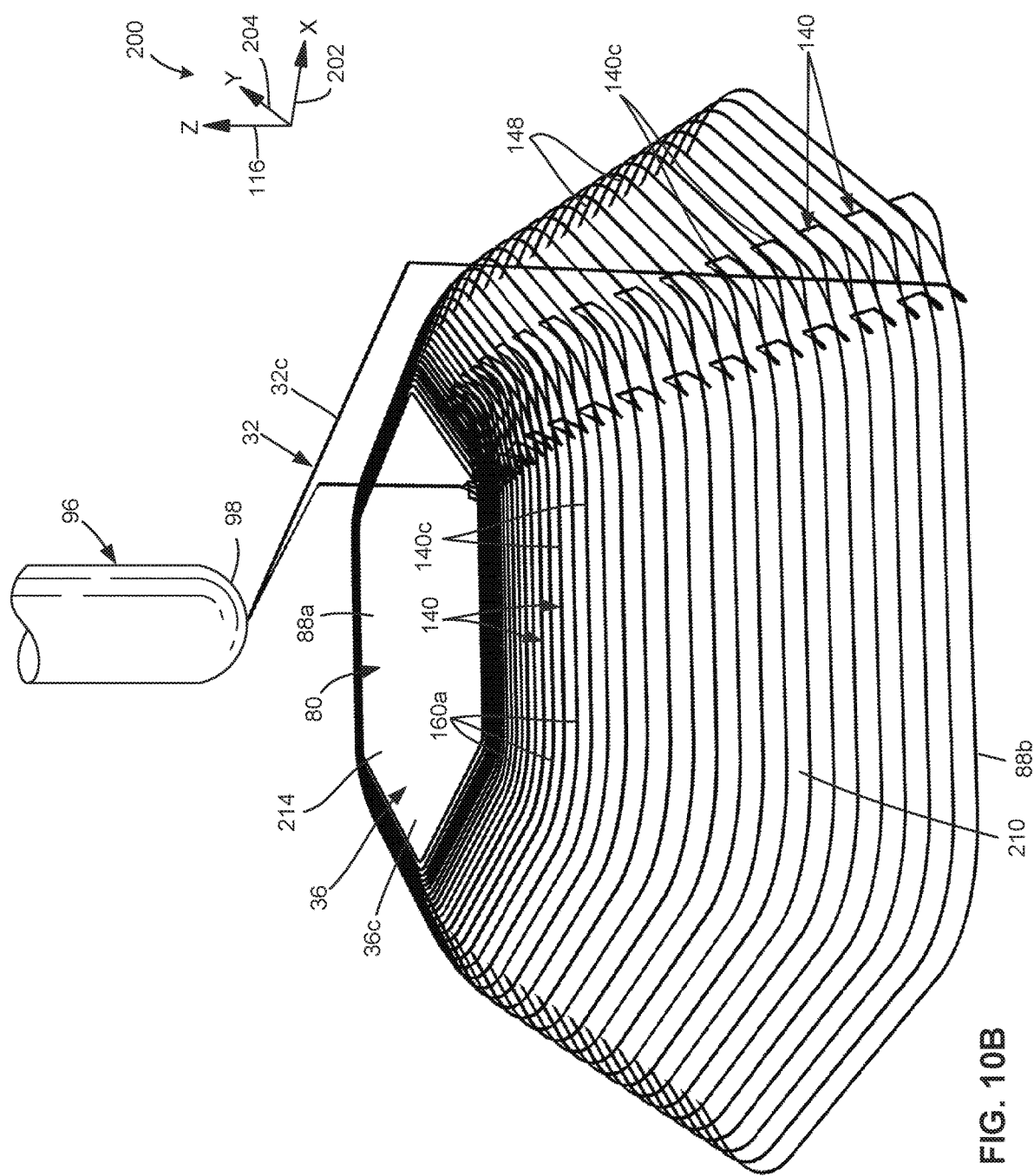
FIG. 10B is an illustration of an isometric view of a slope synchronized tool path of the disclosure for a third contoured part.

Now referring to FIG. 10B, FIG. 10B is an illustration of an isometric view of a slope synchronized tool path 32, such as a third slope synchronized tool path 32c, of the disclosure, for a contoured part 36, such as a third contoured part 36c. The contoured part 36, such as the third contoured part 36c, has the three-dimensional hexagonal shape 214 (see FIG. 10B). FIG. 10B shows the slope synchronized tool path 32, such as the third slope synchronized tool path 32c, with a plurality of stepdowns 140, such as a plurality of third stepdowns 140c, between the plurality of contour tool path loops 160a. Preferably, the plurality of stepdowns 140, such as the plurality of third stepdowns 140c, comprise slope synchronized stepdowns 148 (see FIG. 10B), where the slope synchronized stepdowns 148 are spaced closer together and spaced a smaller distance apart at or near the starting portion 88a of the surface 80 of the contoured part 36, and where the slope synchronized stepdowns 148 are spaced farther apart and at a greater distance apart at or near the ending portion 88b (see FIG. 10B) and along the body portion 210 (see FIG. 10B) of the contoured part 36. The plurality of stepdowns 140 (see FIG. 10B), such as the plurality of third stepdowns 140c (see FIG. 10B), for example, the slope synchronized stepdowns 148 (see FIG. 10B), may preferably each have a distance between two adjacent contour tool path loops 160a in a range of 0.10 mm (millimeter) to 8.0 mm.

FIG. 10B further shows the ISF tool 96 with the ISF tool tip 98 forming the slope synchronized tool path 32, such as the third slope synchronized tool path 32c. FIG. 10B further shows the three-dimensional coordinate axis system 200 with the X-axis 202, the Y-axis 204, and the Z-axis 116. The ISF tool 96 forms the slope synchronized tool path 32, such as the third slope synchronized tool path 32c, by looping downwardly along the Z-axis 116.

Figure 11A:
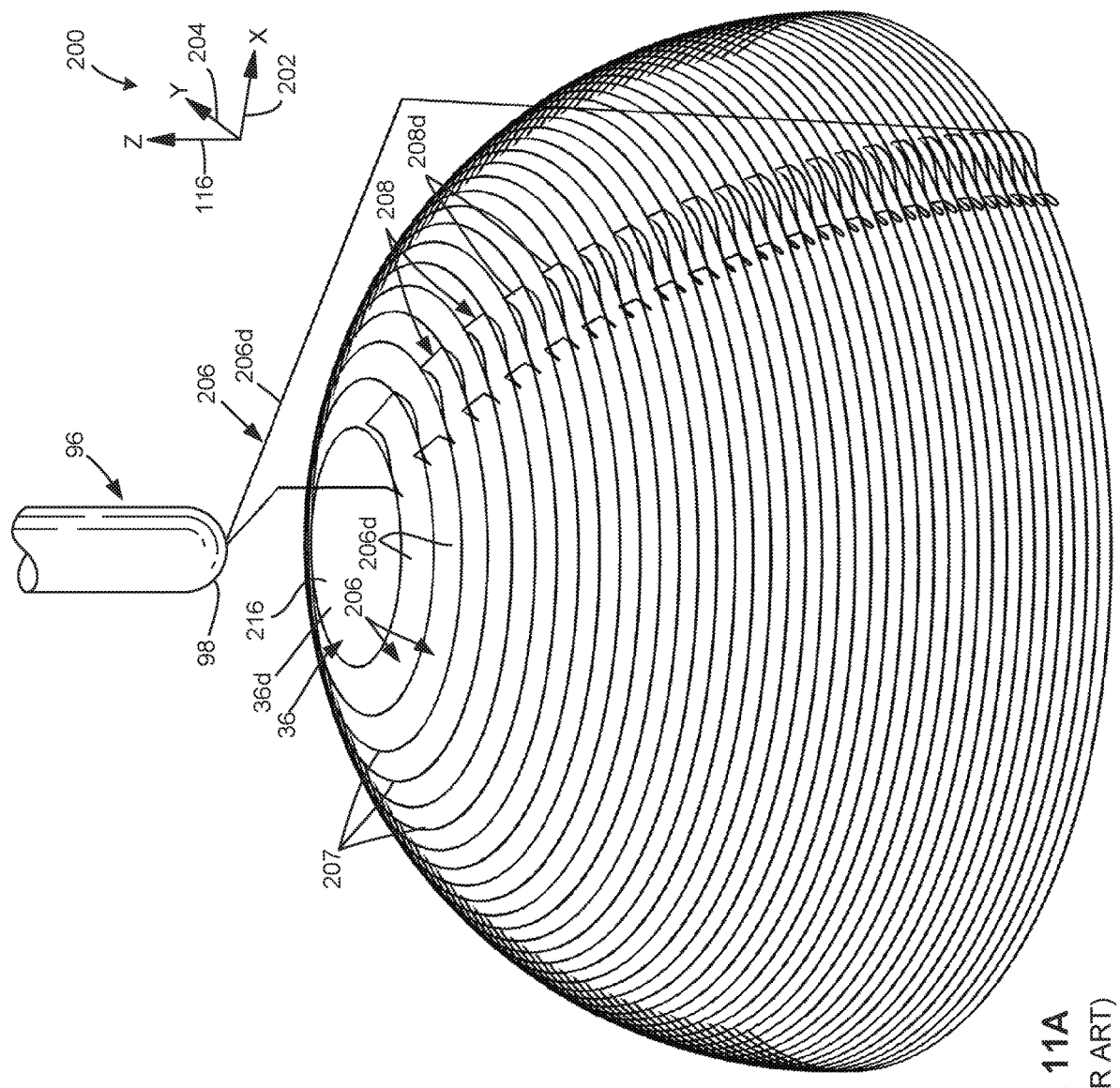
FIG. 11A is an illustration of an isometric view of a known constant stepdown tool path for a fourth contoured part.

Now referring to FIG. 11A, FIG. 11A is an illustration of an isometric view of a known constant stepdown tool path 206, such as a fourth constant stepdown tool path 206d, for a contoured part 36, such as a fourth contoured part 36d. The contoured part 36, such as the fourth contoured part 36d, has a three-dimensional dome shape 216 (see FIG. 11A). FIG. 11A shows the known constant stepdown tool path 206, such as the fourth constant stepdown tool path 206d, with a plurality of constant stepdowns 208, or fixed stepdowns, such as a plurality of fourth constant stepdowns 208d, between the plurality of tool path loops 207. Each constant stepdown 208, such as each fourth constant stepdown 208d, may have, for example, a 4.0 mm (millimeter) distance between two adjacent tool path loops 207. FIG. 11A further shows the ISF tool 96 with the ISF tool tip 98 forming the known constant stepdown tool path 206, such as the fourth constant stepdown tool path 206d. FIG. 11A further shows the three-dimensional coordinate axis system 200 with the X-axis 202, the Y-axis 204, and the Z-axis 116. The known constant stepdown tool path 206, such as the fourth constant stepdown tool path 206d, distributes the action of this tool path uniformly in the Z-direction.

Figure 11B:
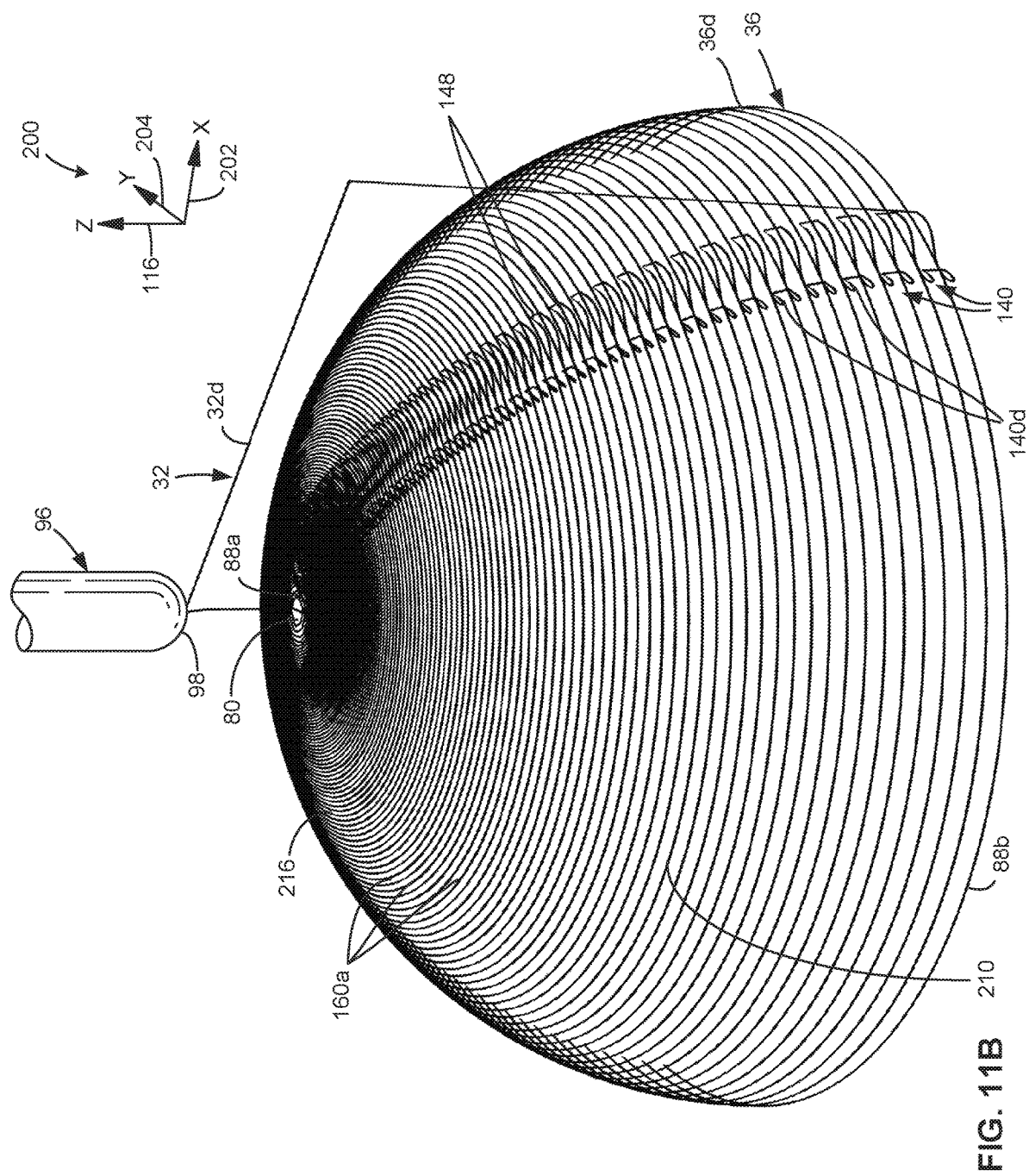
FIG. 11B is an illustration of an isometric view of a slope synchronized tool path of the disclosure for a fourth contoured part.

Now referring to FIG. 11B, FIG. 11B is an illustration of an isometric view of a slope synchronized tool path 32, such as a fourth slope synchronized tool path 32d, of the disclosure, for a contoured part 36, such as a fourth contoured part 36d. The contoured part 36, such as the third contoured part 36c, has the three-dimensional dome shape 216 (see FIG. 11B). FIG. 11B shows the slope synchronized tool path 32, such as the fourth slope synchronized tool path 32d, with a plurality of stepdowns 140, such as a plurality of fourth stepdowns 140d, between the plurality of contour tool path loops 160a. Preferably, the plurality of stepdowns 140, such as the plurality of fourth stepdowns 140d, comprise slope synchronized stepdowns 148 (see FIG. 11B), where the slope synchronized stepdowns 148 are spaced closer together and spaced a smaller distance apart at or near the starting portion 88a of the surface 80 of the contoured part 36, and where the slope synchronized stepdowns 148 are spaced farther apart and at a greater distance apart at or near the ending portion 88b (see FIG. 11B) and along the body portion 210 (see FIG. 11B) of the contoured part 36. The plurality of stepdowns 140 (see FIG. 11B), such as the plurality of fourth stepdowns 140d (see FIG. 11B), for example, the slope synchronized stepdowns 148 (see FIG. 11B), may preferably each have a distance between two adjacent contour tool path loops 160a in a range of 0.10 mm (millimeter) to 8.0 mm.

FIG. 11B further shows the ISF tool 96 with the ISF tool tip 98 forming the slope synchronized tool path 32, such as the fourth slope synchronized tool path 32d. FIG. 11B further shows the three-dimensional coordinate axis system 200 with the X-axis 202, the Y-axis 204, and the Z-axis 116. The ISF tool 96 forms the slope synchronized tool path 32, such as the fourth slope synchronized tool path 32d, by looping downwardly along the Z-axis 116.

EXAMPLE

The computer implemented method 10 was performed to generate a slope synchronized tool path 32 for incremental sheet forming (ISF) 34 of an aircraft metallic repair patch from a blank sheet made of aluminum.

VISUAL STUDIO coding software was used to create code for the computer implemented method. (VISUAL STUDIO is a registered trademark of Microsoft Corporation of Redmond, Wash.)

An initial Z coordinate was set to be a maximum Z coordinate of an offset surface of the part.

A $\Delta Z$ (delta Z, i.e., stepdown) was set to be a small increment in Z (Z value on Z-axis) of 0.05 mm (millimeter).

A surface tessellation was performed on geometry that was developed using CAD (computer aided design) software to produce a collection of polygons in the form of triangles.

While Z>Z min. (Z value is greater than a minimum Z value), the following loop was executed:

(1) $Z=Z-\Delta Z$ (here $\Delta Z$ represents the search stepdown);

(2) Find all triangles which intersect a level plane with a Z coordinate at Z (Z value on a Z-axis);

(3) Find a maximal Z-axis component of a normal vector of the triangles, and call this value a "slope factor"; and (4) Store this value in an array, or a lookup table, of Z values and slope factor values corresponding to the Z values, respectively.

A Z contour tool path (slope synchronized tool path) with a tool path stepdown (stepdown) calculated as a function of the slope factor value was generated. For example:

The initial Z coordinate was reset to be the maximum Z coordinate of the offset surface of the part. Values for a maximum stepdown and a minimum stepdown were provided.

While Z>Z min. (Z value is greater than a minimum Z value), the following loop was executed:

Loop Begins;

(1) Calculate a slope factor from the array of stored Z values and corresponding slope factor values, via interpolation, in order to find a value which corresponds to a current Z value;

(2) $\Delta Z$=minimum stepdown+(maximum stepdown−minimum stepdown)*(1.0−slope factor);

(3) $Z=Z-\Delta Z$;

(4) Find all triangles which intersect a level plane with a Z coordinate at Z (Z value on a Z-axis);

(5) Process an intersection of each of the triangles with the level plane, to produce a collection of vectors in the level plane;

(6) Sort the collection of vectors to be in a tip-to-tail arrangement, to produce a contour loop; and Loop Ends.

An output file with the Z contour tool path (slope synchronized tool path) was then sent to a numerically controlled incremental sheet forming (ISF) machine, such as a DLNC-PC dieless numerically controlled forming machine from Amino North America Corporation of Ontario, Canada. A FANUC CNC controller in the dieless numerically controlled forming machine interpreted G-code of the output file to drive the forming tool of the dieless numerically controlled forming machine. (FANUC is a registered trademark of Fanuc Corporation of Japan.)

Now referring to FIG. 12, FIG. 12 is an illustration of a front view of an exemplary incremental sheet forming (ISF) tool 96 that may be used with the computer implemented method 10 (see FIG. 1A), the computer implemented method 40 (see FIG. 1B), and the computer implemented system 60 (see FIG. 2A) of the disclosure. As shown in FIG. 12, the exemplary ISF tool 96 has a first end 218a and a second end 218b, an incremental sheet forming (ISF) tool tip 98 (220) extending from the first end 218a, and a body portion 220 coupled to or integral with the ISF tool tip 98 and extending between the ISF tool tip 98 and the second end 218b.

Figure 13:
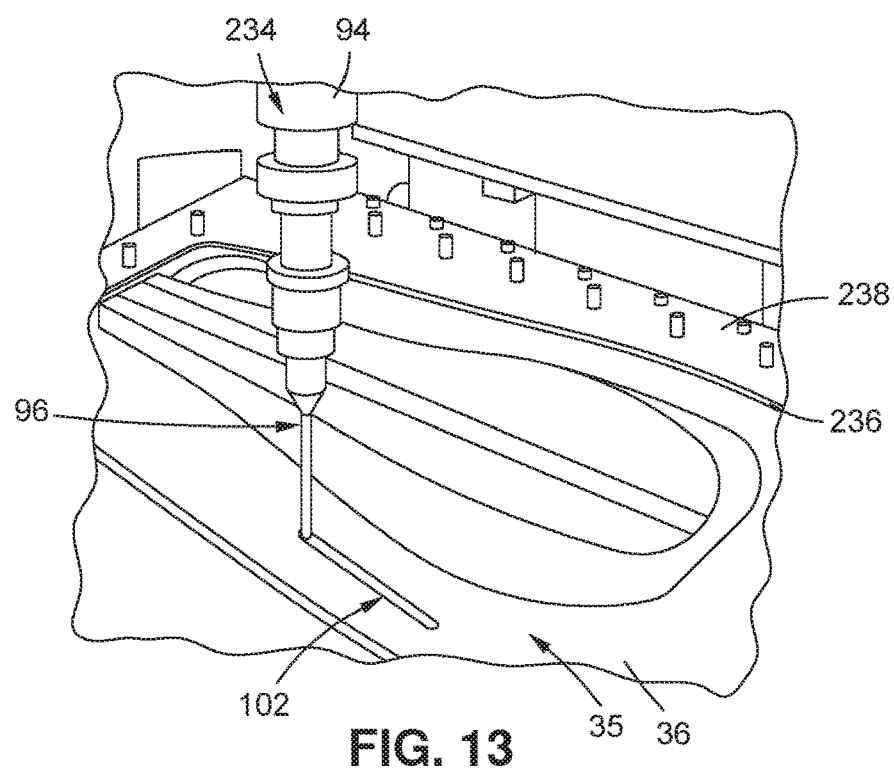
FIG. 13 is an illustration of a partial perspective view of an exemplary numerically controlled incremental sheet forming (ISF) machine with an incremental sheet forming (ISF) tool forming a contoured part formed using one of the computer implemented methods and the computer implemented system of the disclosure.

As discussed above, performing the computer implemented method 10 (see FIG. 1A) and performing the computer implemented method 40 (see FIG. 1B) comprises sending the output file 168 (see FIG. 2A), such as the incremental sheet forming (ISF) command file 168a (see FIG. 2A), to the numerically controlled incremental sheet forming (ISF) machine 94 (see FIGS. 2A, 13). In addition to the output file 168, or included in the output file 168, data 222 (see FIG. 2A) may be included for the ISF tool 96 used to form the part 35 (see FIG. 13), such as the contoured part 36 (see FIG. 13). Such data 222 may comprise parameters for the ISF tool 96, including but not limited to, as shown in FIG. 12, an incremental sheet forming (ISF) tool tip diameter 224, the incremental sheet forming (ISF) tool tip radius 100, a body diameter 226 of the ISF tool 96, an overall length 228 of the ISF tool 96, a length 230 of the ISF tool tip 98 (214), and a centerline 232 of the ISF tool 96. The data 222 for the ISF tool 96 parameters may define the ISF tool 96 contact position on the surface 80 (see FIGS. 3, 4), of the part 35 (see FIGS. 2A, 3), such as the contoured part 36 (see FIGS. 2A, 3).

Now referring to FIG. 13, FIG. 13 is an illustration of a partial perspective view of an exemplary numerical control forming machine 234, such as a numerically controlled ISF machine 94, with an ISF tool 96 forming the part 35, such as the contoured part 36, that may be formed using the computer implemented method 10 (see FIG. 1A), the computer implemented method 40 (see FIG. 1B), and/or the computer implemented system 60 (see FIG. 2A) of the disclosure.

In one exemplary version, the numerical control forming machine 234, such as in the form of the numerically controlled ISF machine 94, may comprise a die 236 (see FIG. 13) attached to a fixture 238 (see FIG. 13). Alternatively, the numerical control forming machine 234, such as in the form of the numerically controlled ISF machine 94, may have no die. FIG. 13 further shows a tool path 102.

The numerical control forming machine 234, such as in the form of the numerically controlled ISF machine 94, preferably uses the process of ISF 34 (see FIG. 2A) to form the part 35 (see FIG. 13), such as the contoured part 36 (see FIG. 13). The process of ISF 34 (see FIG. 2A) is a flexible sheet metal forming technique that uses tooling to locally deform sheet metal along a predefined tool path to impart the sheet with a desired or designated shape, such as a three-dimensional shape or geometry. Single point incremental forming (SPIF) uses a single forming tool on one side of the sheet metal to cause the deformation. Dual-sided incremental forming (DSIF) uses one forming tool above the sheet metal and another forming tool below the sheet to cause the deformation. Two point incremental forming (TPIF) uses one or more forming tools and a sheet formed against full or partial dies.

The process of ISF 34 (see FIG. 2A) may be performed on a number of different types of sheet metal materials. For example, without limitation, the process of ISF 34 (see FIG. 2A) may be performed using aluminum, steel, titanium, and/or other suitable metals. The sheet metal may be formed using the ISF tool 96 (see FIGS. 12, 13), or another suitable type of tool. The ISF tool 96, or other suitable tool, may be attached to the numerical control forming machine 234 (see FIG. 13), such as the numerically controlled ISF machine 94 (see FIG. 13), or to a robot arm, or to another suitable machine or system to shape the sheet metal into the desired shape for the part 35 (see FIG. 13), such as the contoured part 36 (see FIG. 13), such as in the form of a sheet metal part. The ISF tool 96 (see FIG. 13), or other suitable tool, makes indentations, creases, or other physical changes or deformations into the sheet metal that may follow a tool path, contour, or mold line for the desired part. This tool path, contour, or mold line may be defined using the die 236 (see FIG. 13) or tool on which the ISF tool 96 (see FIG. 13) presses or deforms the sheet metal material.

Figure 14:
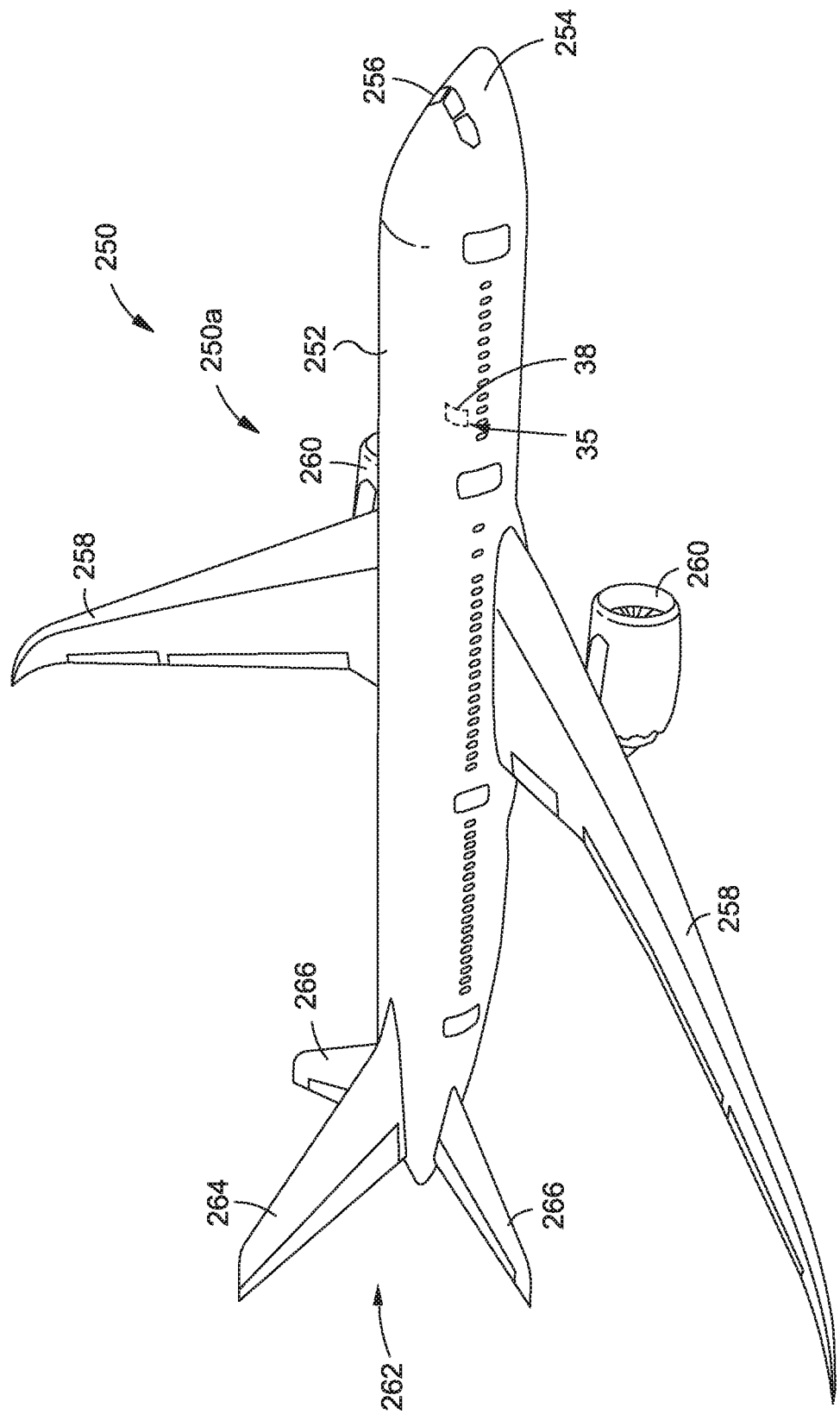
FIG. 14 is an illustration of a perspective view of an air vehicle incorporating a contoured part formed using one of the computer implemented methods and the computer implemented system of the disclosure.

Now referring to FIG. 14, FIG. 14 is a diagrammatic representation of a perspective view of an air vehicle 250, such as in the form of an aircraft 250a, that incorporates a part 35, such as an aircraft contoured part 38, formed using the computer implemented method 10 (see FIG. 1A), the computer implemented method 40 (see FIG. 1B), and the computer implemented system 60 (see FIG. 2A) of the disclosure. As further shown in FIG. 14, the air vehicle 250, such as in the form of aircraft 250a, comprises fuselage 252, a nose 254, a cockpit 256, wings 258, engines 260, and an empennage 262 comprising a vertical stabilizer 264 and horizontal stabilizers 266. Although the aircraft 250a shown in FIG. 14 is generally representative of a commercial passenger aircraft having one or more parts 35, such as one or more contoured parts 36, for example, one or more aircraft contoured parts 38, the teachings of the disclosed versions and examples may be applied to other passenger aircraft. For example, the teachings of the disclosed versions and examples may be applied to cargo aircraft, military aircraft, rotorcraft, and other types of aircraft or aerial vehicles, as well as aerospace vehicles, satellites, space launch vehicles, rockets, and other aerospace vehicles.

Figure 15:
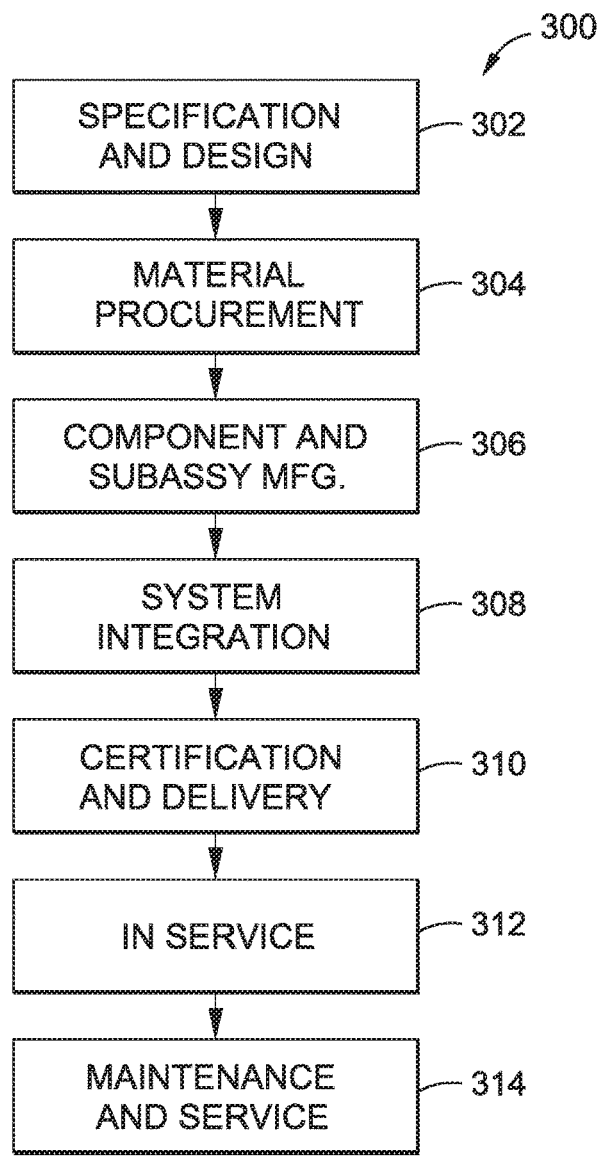
FIG. 15 is a flow diagram of a version of an aircraft manufacturing and service method.
Figure 16:
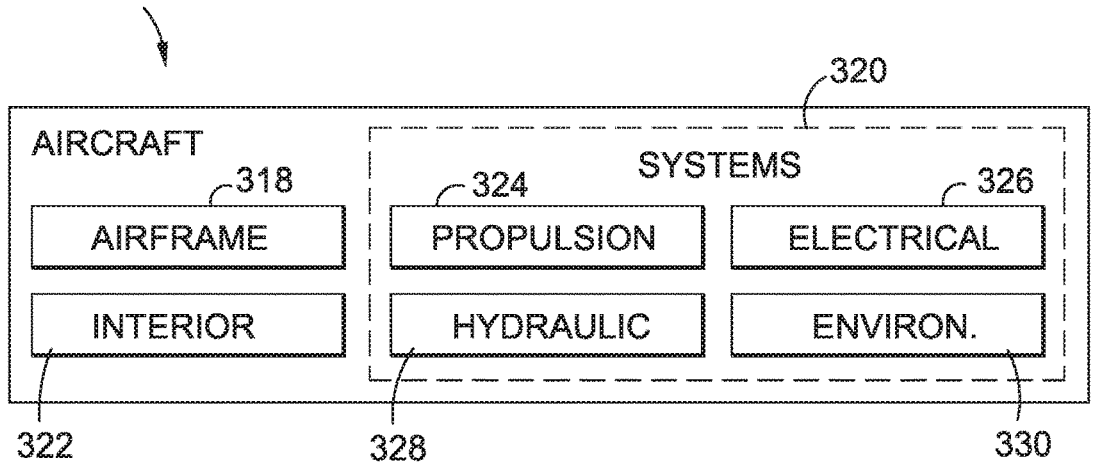
FIG. 16 is an illustration of a functional block diagram of a version of an aircraft.

Now referring to FIGS. 15 and 16, FIG. 15 is a flow diagram of an embodiment of an aircraft manufacturing and service method 300, and FIG. 16 is an illustration of a functional block diagram of an embodiment of an aircraft 316. Referring to FIGS. 15-16, versions of the disclosure may be described in the context of the aircraft manufacturing and service method 300, as shown in FIG. 15, and the aircraft 316, as shown in FIG. 14. During pre-production, the exemplary aircraft manufacturing and service method 300 (see FIG. 15) may include specification and design 302 (see FIG. 15) of the aircraft 316 (see FIG. 16) and material procurement 304 (see FIG. 15). During manufacturing, component and subassembly manufacturing 306 (see FIG. 15) and system integration 308 (see FIG. 15) of the aircraft 316 (see FIG. 16) takes place. Thereafter, the aircraft 316 (see FIG. 16) may go through certification and delivery 310 (see FIG. 15) in order to be placed in service 312 (see FIG.

15). While in service 312 (see FIG. 15) by a customer, the aircraft 316 (see FIG. 16) may be scheduled for routine maintenance and service 314 (see FIG. 15), which may also include modification, reconfiguration, refurbishment, and other suitable services.

Each of the processes of the aircraft manufacturing and service method 300 (see FIG. 15) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 16, the aircraft 316 produced by the exemplary aircraft manufacturing and service method 300 may include an airframe 318 with a plurality of systems 320 and an interior 322. As further shown in FIG. 16, examples of the systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry, including automotive vehicles, the marine industry, including watercraft, ships, and submarines, and other suitable industries.

Methods and systems embodied herein may be employed during any one or more of the stages of the aircraft manufacturing and service method 300 (see FIG. 15). For example, components or subassemblies corresponding to component and subassembly manufacturing 306 (see FIG. 15) may be fabricated or manufactured in a manner similar to components or subassemblies produced while the aircraft 316 (see FIG. 16) is in service 312 (see FIG. 15). Also, one or more method embodiments, system embodiments, or a combination thereof, may be utilized during component and subassembly manufacturing 306 (see FIG. 15) and system integration 308 (see FIG. 15), for example, by substantially expediting assembly of, or reducing the cost of, the aircraft 316 (see FIG. 16). Similarly, one or more of method versions, system versions, or a combination thereof, may be utilized while the aircraft 316 (see FIG. 16) is in service 312 (see FIG. 15), for example and without limitation, to maintenance and service 314 (see FIG. 15).

Disclosed versions of the computer implemented method 10 (see FIG. 1A), the computer implemented method 40 (see FIG. 1B), and the computer implemented system 60 (see FIG. 2A) provide the novel feature of calculating the minimum wall angle 162 (see FIG. 2A) on a given contour tool path loop 160 (see FIGS. 2A, 6B), and using this minimum wall angle 162 that is calculated to adjust the stepdown 140 (see FIGS. 2A, 5B), i.e., ΔZ, on the next subsequent contour loop 158b (see FIG. 2A). The series of slope synchronized tool paths 32 (see FIG. 2A) are generated with slope synchronized stepdowns 148 (see FIG. 2A) determined as a function of the slope factor 122 (see FIG. 2A) of the contoured part 36 (see FIG. 2A). Disclosed versions of the computer implemented method 10 (see FIG. 1A), the computer implemented method 40 (see FIG. 1B), and the computer implemented system 60 (see FIG. 2A) provide a tool path generation algorithm to adapt a next subsequent contour loop 158b (see FIG. 2A) to a minimum slope encountered on a current contour loop 158a (see FIG. 2A) at a current Z coordinate 136b (see FIG. 2A) of a given contour tool path loop 160 (see FIG. 2A), and take into account the slope 121 (see FIG. 2A) of the part 35 (see FIG. 2A).

In addition, disclosed versions of the computer implemented method 10 (see FIG. 1A), the computer implemented method 40 (see FIG. 1B), and the computer implemented system 60 (see FIG. 2A) improve the quality of parts 35 (see FIG. 2A), such as contoured parts 36 (see FIG. 2A), having wall angles 164 (see FIG. 2A) that are shallow, and that are preferably formed by the process of ISF 34 (see FIG. 2A). Because the computer implemented method 10 (see FIG. 1A), the computer implemented method 40 (see FIG. 1B), and the computer implemented system 60 (see FIG. 2A) do not necessarily have constant or fixed stepdowns, which may be too small for steep slopes, or too large for shallow slopes, the parts 35 formed using the computer implemented method 10 (see FIG. 1A), the computer implemented method 40 (see FIG. 1B), and the computer implemented system 60 (see FIG. 2A) avoid surface imperfections, such as uneven step-across imperfections, surface ridges, and surface blemishes, that may occur during ISF 34 (see FIG. 2A). Reducing or eliminating surface imperfections may result in reducing or eliminating secondary surface treatment processes to remove the surface imperfections, and may, in turn, result in decreased time and expense of manufacturing. Thus, disclosed versions of the computer implemented method 10 (see FIG. 1A), the computer implemented method 40 (see FIG. 1B), and the computer implemented system 60 (see FIG. 2A) may improve the shape definition and surface finish on shallow walled sections of parts 35 which are formed using the ISF 34 manufacturing process. This may reduce the need to rework the parts 35, and in turn, may reduce the cost of manufacturing and production of such parts 35.

Moreover, disclosed versions of the computer implemented method 10 (see FIG. 1A), the computer implemented method 40 (see FIG. 1B), and the computer implemented system 60 (see FIG. 2A) may easily be automated and implemented with computer readable software programs 72 (see FIG. 2B) by simply interfacing the defined instructions or steps of the computer implemented methods 10, 40 (see FIGS. 1A, 1B) with variable user inputs. Further, disclosed versions of the computer implemented method 10 (see FIG. 1A), the computer implemented method 40 (see FIG. 1B), and the computer implemented system 60 (see FIG. 2A) may provide faster lead time to fabricate new tooling and produce replacement parts or spare parts, such as replacement parts or spare parts for aircraft and rotorcraft brought back into service. For example, the lead time to fabricate new tooling and manufacture the part, from design to manufacture, may be reduced significantly, and may result in overall decreased time and costs of manufacturing. In addition, disclosed versions of the computer implemented method 10 (see FIG. 1A), the computer implemented method 40 (see FIG. 1B), and the computer implemented system 60 (see FIG. 2A) are adaptable to complex part design geometries and production of parts in limited numbers and for prototype testing, and generate and output an output file 168 (see FIG. 2A) for a numerically controlled ISF machine 94 (see FIG. 2A) for incremental sheet forming of parts 35 (see FIGS. 2A, 3), such as contoured parts 36 (see FIGS. 2A, 3), and provide benefit to air vehicles 250 (see FIG. 14), such as aircraft 250a (see FIG. 14, including commercial aircraft and rotorcraft.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation. Any claimed embodiment of the disclosure does not necessarily include all of the embodiments of the disclosure.

What is claimed is:

1. A computer implemented method for generating a series of slope synchronized tool paths for incremental sheet forming (ISF) of a contoured part, the computer implemented method comprising the steps of:
providing a computer system comprising a computer having a processor device, and comprising a modeling application and a slope synchronized tool path application, each implemented by a computer readable software program and each executed by the computer;
performing, with the computer and the slope synchronized tool path application, a slope synchronized tool path application execution comprising the substeps of:
defining a plurality of equally spaced apart Z values along a Z-axis, where each of the plurality of equally spaced apart Z values intersects a surface that approximates a three-dimensional geometry of the contoured part;
determining, for each of the plurality of equally spaced apart Z values, a slope factor based on a maximal Z-axis component of a normal vector, for the surface intersecting each of the plurality of equally spaced apart Z values, to define an array of Z values and slope factor values that correspond to the Z values; and
setting an initial Z coordinate corresponding to a starting portion of the surface, as a current Z coordinate;
the slope synchronized tool path application execution then iteratively:
calculating a stepdown as a sum of a minimum stepdown and a percentage of a maximum stepdown less the minimum stepdown, to obtain a calculated stepdown, the percentage based on a current slope factor for the current Z coordinate, that is calculated based on the array of the Z values and the slope factor values that correspond to the Z values;
decrementing the current Z coordinate by the calculated stepdown; and
determining an intersection of the surface with a horizontal plane at the current Z coordinate, to define a collection of analytical curves in the horizontal plane, to produce a contour tool path loop for the current Z coordinate, wherein the slope synchronized tool path application creates a plurality of contour tool path loops that are each respectively spaced apart by slope synchronized stepdowns, to obtain the series of slope synchronized tool paths; and
sending an output file, using the computer, to a numerically controlled incremental sheet forming (ISF) machine, which causes the numerically controlled incremental sheet forming (ISF) machine to direct an incremental sheet forming (ISF) tool along the series of slope synchronized tool paths comprising the plurality of contour tool path loops spaced apart by the slope synchronized stepdowns, to incrementally form the contoured part.

2. The computer implemented method of claim 1, wherein prior to performing the slope synchronized tool path application execution, the computer implemented method further comprises the step of performing, with the computer and the modeling application, a surface discretization of the three-dimensional geometry of the contoured part, to produce the surface comprising a surface mesh of polygons that approximates the three-dimensional geometry of the contoured part.

3. The computer implemented method of claim 2, wherein performing the surface discretization of the three-dimensional geometry of the contoured part further comprises, performing the surface discretization, to produce the surface mesh of polygons comprising one or more of, triangles, quadrilaterals, pentagons, hexagons, and a combination of polygons, that approximates the three-dimensional geometry of the contoured part.

4. The computer implemented method of claim 2, wherein determining the intersection of the surface further comprises, determining the intersection of the surface mesh with a current horizontal plane at the current Z coordinate, to define a collection of vectors in the current horizontal plane, and sorting the collection of vectors in a tip-to-tail arrangement, to produce the contour tool path loop for the current Z coordinate.

5. The computer implemented method of claim 2, wherein performing the surface discretization of the three-dimensional geometry of the contoured part further comprises, using the modeling application to generate an offset surface spaced a constant offset distance from the surface that approximates the three-dimensional geometry of the contoured part, to account for an incremental sheet forming (ISF) tool tip radius of an incremental sheet forming (ISF) tool tip of the incremental sheet forming (ISF) tool, and to account for a blank sheet thickness.

6. The computer implemented method of claim 1, wherein determining, for each of the plurality of equally spaced apart Z values, the slope factor, further comprises, determining, for each of the plurality of equally spaced apart Z values, the slope factor, for the surface, to define the array comprising a lookup table of the Z values and the slope factor values corresponding to the Z values.

7. The computer implemented method of claim 1, wherein calculating the stepdown further comprises, calculating the current slope factor for the current Z coordinate using interpolation, when the current Z coordinate is between two adjacent Z values of the Z values defined in the array.

8. The computer implemented method of claim 1, wherein calculating the stepdown further comprises, calculating the stepdown as the minimum stepdown plus a quantity of the maximum stepdown minus the minimum stepdown multiplied by a quantity of 1 (one) minus the current slope factor, to obtain the calculated stepdown.

9. A computer implemented method for generating a series of slope synchronized tool paths for incremental sheet forming of an aircraft contoured part, the computer implemented method comprising the steps of:
providing a computer system comprising a computer having a processor device, and comprising a modeling application and a slope synchronized tool path application, each implemented by a computer readable software program and each executed by the computer;
performing, with the computer and the modeling application, a surface discretization of a three-dimensional geometry of the aircraft contoured part, to produce a surface mesh of polygons that approximates the three-dimensional geometry of the aircraft contoured part;
performing, with the computer and the slope synchronized tool path application, a slope synchronized tool path application execution comprising the substeps of:
defining a plurality of horizontal planes equally spaced apart at a plurality of Z values along a Z-axis, where each of the plurality of horizontal planes intersects the surface mesh of polygons that approximates the three-dimensional geometry of the aircraft contoured part;

determining, for each of the plurality of horizontal planes, a slope factor based on a maximal Z-axis component of a normal vector for each polygon intersecting each of the plurality of horizontal planes, to define a lookup table of Z values and slope factor values that correspond to the Z values; and setting an initial Z coordinate corresponding to a starting portion of the surface mesh, as a current Z coordinate;

the slope synchronized tool path application execution then iteratively:

calculating a stepdown as a sum of a minimum stepdown and a percentage of a maximum stepdown less the minimum stepdown, to obtain a calculated stepdown, the percentage based on a current slope factor for the current Z coordinate, that is calculated based on the lookup table of the Z values and the slope factor values that correspond to the Z values;

decrementing the current Z coordinate by the calculated stepdown; and determining an intersection of the surface mesh with a current horizontal plane at the current Z coordinate, to define a collection of vectors in the current horizontal plane, and sorting the collection of vectors in a tip-to-tail arrangement, to produce a contour tool path loop for the current Z coordinate, wherein the slope synchronized tool path application creates a plurality of contour tool path loops that are each respectively spaced apart by slope synchronized stepdowns, to obtain the series of slope synchronized tool paths; and sending an output file, using the computer, to a numerically controlled incremental sheet forming (ISF) machine, which causes the numerically controlled incremental sheet forming (ISF) machine to direct an incremental sheet forming (ISF) tool along the series of slope synchronized tool paths comprising the plurality of contour tool path loops spaced apart by the slope synchronized stepdowns, to incrementally form the aircraft contoured part.

10. The computer implemented method of claim 9, wherein performing the surface discretization of the three-dimensional geometry of the aircraft contoured part further comprises, using the modeling application to generate an offset surface spaced a constant offset distance from the surface mesh that approximates the three-dimensional geometry of the aircraft contoured part, to account for an incremental sheet forming (ISF) tool tip radius of an incremental sheet forming (ISF) tool tip of the incremental sheet forming (ISF) tool, and to account for a blank sheet thickness.

11. The computer implemented method of claim 9, wherein calculating the stepdown further comprises, calculating the current slope factor for the current Z coordinate using interpolation, when the current Z coordinate is between two adjacent Z values of the Z values defined in the lookup table.

12. The computer implemented method of claim 9, wherein calculating the stepdown further comprises, calculating the stepdown as the minimum stepdown plus a quantity of the maximum stepdown minus the minimum stepdown multiplied by a quantity of 1 (one) minus the current slope factor, to obtain the calculated stepdown.

13. A computer implemented system for generating a series of slope synchronized tool paths for incremental sheet forming (ISF) of a contoured part, the computer implemented system comprising:

a computer having a processor device and a modeling application implemented by a first computer readable software program and executed by the computer, the modeling application adapted to perform a surface discretization of a three-dimensional geometry of the contoured part, to produce a surface mesh of polygons that approximates the three-dimensional geometry of the contoured part; and a slope synchronized tool path application implemented by a second computer readable software program and executed by the computer, the slope synchronized tool path application adapted to:

define a plurality of equally spaced apart Z values along a Z-axis, where each of the plurality of equally spaced apart Z values intersects the surface mesh of polygons that approximates the three-dimensional geometry of the contoured part;

determine, for each of the plurality of equally spaced apart Z values, a slope factor based on a maximal Z-axis component of a normal vector, for each polygon intersecting each of the plurality of equally spaced apart Z values, to define an array of Z values and slope factor values that correspond to the Z values; and set an initial Z coordinate corresponding to a starting portion of the surface mesh, as a current Z coordinate;

the slope synchronized tool path application then adapted to iteratively:

calculate a stepdown as a sum of a minimum stepdown and a percentage of a maximum stepdown less the minimum stepdown, to obtain a calculated stepdown, the percentage based on a current slope factor for the current Z coordinate, that is calculated based on the array of the Z values and the slope factor values that correspond to the Z values;

decrement the current Z coordinate by the calculated stepdown; and determine an intersection of the surface mesh with a horizontal plane at the current Z coordinate, to define a collection of vectors in the horizontal plane, to produce a contour tool path loop for the current Z coordinate, wherein the slope synchronized tool path application creates a plurality of contour tool path loops that are each respectively spaced apart by slope synchronized stepdowns, to obtain the series of slope synchronized tool paths, wherein the computer sends an output file to a numerically controlled incremental sheet forming machine, which causes the numerically controlled incremental sheet forming machine to direct an incremental sheet forming tool along the series of slope synchronized tool paths comprising the plurality of contour tool path loops spaced apart by the slope synchronized stepdowns, to incrementally form the contoured part.

14. The computer implemented system of claim 13, wherein the polygons of the surface mesh comprise one or more of, triangles, quadrilaterals, pentagons, hexagons, and a combination of polygons, that approximate the three-dimensional geometry of the contoured part.

15. The computer implemented system of claim 13, wherein the modeling application generates an offset surface spaced a constant offset distance from the surface mesh that approximates the three-dimensional geometry of the contoured part, to account for an incremental sheet forming (ISF) tool tip radius of an incremental sheet forming (ISF) tool tip of the incremental sheet forming (ISF) tool, and to account for a blank sheet thickness.

16. The computer implemented system of claim 13, wherein the array comprises a lookup table of the Z values and the slope factor values corresponding to the Z values.

17. The computer implemented system of claim 13, wherein the current slope factor for the current Z coordinate is calculated using interpolation, when the current Z coordinate is between two adjacent Z values of the Z values defined in the array.

18. The computer implemented system of claim 13, wherein the stepdown is calculated as the minimum stepdown plus a quantity of the maximum stepdown minus the minimum stepdown multiplied by a quantity of 1 (one) minus the current slope factor.

19. The computer implemented system of claim 13, wherein the collection of vectors is sorted in a tip-to-tail arrangement, to produce the contour tool path loop for the current Z coordinate.

20. The computer implemented system of claim 13, wherein the contoured part comprises an aircraft contoured part for use in an aircraft.

* * * * *